United States Patent
Yokokawa et al.

(10) Patent No.: US 8,873,679 B2
(45) Date of Patent: Oct. 28, 2014

(54) RECEPTION APPARATUS AND METHOD, PROGRAM AND RECEPTION SYSTEM

(75) Inventors: Takashi Yokokawa, Kanagawa (JP); Satoshi Okada, Tokyo (JP)

(73) Assignee: Sony Corporation, Tokyo (JP)

( * ) Notice: Subject to any disclaimer, the term of this patent is extended or adjusted under 35 U.S.C. 154(b) by 953 days.

(21) Appl. No.: 12/981,948

(22) Filed: Dec. 30, 2010

(65) Prior Publication Data

US 2011/0164703 A1 Jul. 7, 2011

(30) Foreign Application Priority Data

Jan. 6, 2010 (JP) ................................ P2010-000919

(51) Int. Cl.
| | |
|---|---|
| H04N 21/43 | (2011.01) |
| H04N 21/214 | (2011.01) |
| H04W 4/00 | (2009.01) |
| H04N 21/236 | (2011.01) |
| H04N 21/434 | (2011.01) |
| H04H 60/40 | (2008.01) |
| H04N 21/235 | (2011.01) |
| H04L 27/26 | (2006.01) |
| H04N 21/2383 | (2011.01) |
| H04N 21/242 | (2011.01) |
| H04N 21/438 | (2011.01) |
| H04N 21/435 | (2011.01) |
| H04H 40/18 | (2008.01) |

(52) U.S. Cl.
CPC ...... *H04L 27/2647* (2013.01); *H04N 21/23608* (2013.01); *H04N 21/4302* (2013.01); *H04N 21/4345* (2013.01); *H04H 60/40* (2013.01); *H04N 21/235* (2013.01); *H04N 21/4344* (2013.01); *H04N 21/434* (2013.01); *H04N 21/4305* (2013.01); *H04N 21/2383* (2013.01); *H04N 21/242* (2013.01); *H04N 21/4382* (2013.01); *H04N 21/435* (2013.01); *H04H 40/18* (2013.01)
USPC ............ 375/316; 375/354; 375/340; 375/356

(58) Field of Classification Search
USPC ............... 375/219, 220, 222, 240.25, 240.24, 375/240.26, 240.27, 285, 295, 316, 324, 375/340, 346, 354, 356
See application file for complete search history.

(56) References Cited

U.S. PATENT DOCUMENTS

2006/0168524 A1    7/2006    Saeki

FOREIGN PATENT DOCUMENTS

| EP | 1 615 433 A1 | 1/2006 |
|---|---|---|
| EP | 1615433 A1 * | 1/2006 |

(Continued)

OTHER PUBLICATIONS

Frame structure channel coding and modulation for a second generation digital terestrial television broadcasting system (DVB-T2) Digital Video Broadcasting, Jun. 2008 pp. 1-156.*

(Continued)

*Primary Examiner* — Sam K Ahn
*Assistant Examiner* — Linda Wong
(74) *Attorney, Agent, or Firm* — Oblon, Spivak, McClelland, Maier & Neustadt, L.L.P.

(57) ABSTRACT

Disclosed herein is a reception apparatus, including: a reception section configured to receive an OFDM (Orthogonal Frequency Division Multiplexed) signal obtained by modulating a common packet sequence configured from a packet common to streams and a data packet sequence configured from packets individually unique to the streams; a time counting section configured to count, using predetermined time indicated by additional information added to particular packets of the common and data packet sequences obtained by demodulating the received OFDM signal as a reference, elapsed time after the predetermined time; a detection section configured to compare the counted time and time indicated by the additional information added to the particular packets of the common and data packet sequences to detect a displacement in the time direction between the packets; and a correction section configured to correct the displacement between the packets of the common and data packet sequences in the time direction.

20 Claims, 19 Drawing Sheets

(56) References Cited

FOREIGN PATENT DOCUMENTS

| JP | 2006-157278 | 6/2006 |
|----|----|----|
| JP | 2008-252843 | 10/2008 |
| JP | 2011-525322 | 9/2011 |
| WO | WO 2004/084553 A1 | 9/2004 |

OTHER PUBLICATIONS

U.S. Appl. No. 12/981,894, filed Dec. 30, 2010, Yokokawa, et al.

Extended European Search Report issued Jul. 5, 2011, in Patent Application No. 10196727.1.

"Frame structure channel coding and modulation for a second generation digital terrestrial television broadcastng system (DVB-T2)", Digital Video Broadcasting, http://www.dvb.org/technology/dvbt2/a122.tm3980r5.DVB-T2.pdf, XP2546005, Jun. 2008, pp. 1-158.

Office Action issued Oct. 31, 2013 in Japanese Application No. 2010-000919.

* cited by examiner

RECEPTION APPARATUS AND METHOD, PROGRAM AND RECEPTION SYSTEM

BACKGROUND OF THE INVENTION

1. Field of the Invention

This invention relates to a reception apparatus and method, a program and a reception system, and particularly to a reception apparatus and method, a program and a reception system by which synchronism can be re-established.

2. Description of the Related Art

In recent years, as a system for transmitting a digital signal, a modulation system called orthogonal frequency division multiplexing (OFDM) system is used. In the OFDM system, a large number of orthogonal subcarriers are prepared in a transmission band, and data are applied to the amplitude and the phase of each subcarrier to digitally modulate the data by PSK (Phase Shift Keying) or QAM (Quadrature Amplitude Modulation).

The OFDM system is frequently applied to terrestrial digital broadcasting which is influenced much by a multipath disturbance. As a standard for terrestrial digital broadcasting which adopts the OFDM system, such standards as, for example, DVB-T (Digital Video Broadcasting-Terrestrial) and ISDB-T (Integrated Services Digital Broadcasting-Terrestrial) are available.

Incidentally, DVB (Digital Video Broadcasting)-T.2 as a standard for terrestrial digital broadcasting of the next generation is being established by the ETSI (European Telecommunication Standards Institute) (refer to "Frame structure channel coding and modulation for a second generation digital terrestrial broadcasting system (VBG-T2)," DVB Document A122, June 2008.

SUMMARY OF THE INVENTION

DVB-T.2 uses a system called M-PLP (Multiple PLP (Physical Layer Pipe)). In the M-PLP system, data are transmitted using a packet sequence called Common PLP formed from a common packet extracted from a plurality of transport streams (hereinafter referred to as TSs) and a packet sequence called Data PLP formed from the TSs from which such common packets are extracted. In other words, it can be considered that the Common PLP is configured from packets common to a plurality of TSs while the Data PLP is configured from packets which are unique to the individual TSs. The reception side restores one TS from the Common PLP and the Data PLP.

In order to restore the TS, it is necessary for the reception side to establish synchronism between a Common PLP and a Data PLP. However, if a wrong signal caused by a reception channel environment or the like is received after synchronism between a Common PLP and a Data PLP is established and a steady state is entered, then the synchronism between a Common PLP and a Data PLP is sometimes lost. In this instance, it is required to carry out re-establishment of synchronism between a Common PLP and a Data PLP rapidly.

Thus, it is desirable to provide a reception apparatus and method, a program and a reception system by which synchronism can be re-established rapidly after synchronism between different packet sequences such as a Common PLP and a Data PLP is lost.

According to an embodiment of the present invention, there is provided a reception apparatus, including:

reception means for receiving an OFDM (Orthogonal Frequency Division Multiplexed) signal obtained by modulating a common packet sequence configured from a packet common to a plurality of streams and a data packet sequence configured from a plurality of packets individually unique to the plural streams;

time counting means for counting, using predetermined time indicated by additional information added to particular packets of the common packet sequence and the data packet sequence obtained by demodulating the received OFDM signal as a reference, elapsed time after the predetermined time;

detection means for comparing the counted time and time indicated by the additional information added to the particular packets of the common packet sequence and the data packet sequence with each other to detect a displacement in the time direction between the packets; and correction means for correcting the displacement between the packets of the common packet sequence and the data packet sequence in the time direction based on a result of the detection.

The time counting means counts relative time to reference time which is predetermined time used as a reference from within time indicated by the additional information. The detection means compares the counted relative time and additional time indicated by the additional information added to the particular packet later in time than the particular packet to which the additional information which indicates the predetermined time used as the reference to detect displacement of the time. The correction means corrects a readout timing of the packet in response to the detected displacement of the time.

The time counting means successively adds time per one packet for each packet to the reference time to count the relative time.

The common packet sequence and the data packet sequence may be Common PLPs and Data PLPs, respectively, produced from a plurality of streams in accordance with the M-PLP (Multiple PLP (Physical Layer Pipe)) system of DVB-T (Digital Video Broadcasting-Terrestrial).2.

The additional information is an ISCR (Input Stream Time Reference) which indicates a timestamp added upon transmission.

In the reception apparatus, not only the ISCR but also a DNP (Deleted Null Packet) which is information indicative of a number of Null packets are added as the additional information to the packet. If the additional time is earlier than the relative time, then the correction means increases the value of the DNP by a value corresponding to the displacement of the time, but if the additional time delays with respect to the relative time, then the correction means decreases the value of DNPs by a value corresponding to the displacement of the time.

According to the embodiment of the present invention, there is provided a reception method, including the steps, carried out by a reception apparatus, of:

receiving an OFDM (Orthogonal Frequency Division Multiplexed) signal obtained by modulating a common packet sequence configured from a packet common to a plurality of streams and a data packet sequence configured from a plurality of packets individually unique to the plural streams;

counting, using predetermined time indicated by additional information added to particular packets of the common packet sequence and the data packet sequence obtained by demodulating the received OFDM signal as a reference, elapsed time after the predetermined time;

comparing the counted time and time indicated by the additional information added to the particular packets of the common packet sequence and the data packet sequence with each other to detect a displacement in the time direction between the packets; and correcting the displacement between the packets of the common packet sequence and the data packet sequence in the time direction based on a result of the detection.

According to the embodiment of the present invention, there is provided a program for causing a computer to function as:

reception means for receiving an OFDM (Orthogonal Frequency Division Multiplexed) signal obtained by modulating a common packet sequence configured from a packet common to a plurality of streams and a data packet sequence configured from a plurality of packets individually unique to the plural streams;

time counting means for counting, using predetermined time indicated by additional information added to particular packets of the common packet sequence and the data packet sequence obtained by demodulating the received OFDM signal as a reference, elapsed time after the predetermined time;

detection means for comparing the counted time and time indicated by the additional information added to the particular packets of the common packet sequence and the data packet sequence with each other to detect a displacement in the time direction between the packets; and correction means for correcting the displacement between the packets of the common packet sequence and the data packet sequence in the time direction based on a result of the detection.

In the reception apparatus, reception method and program according to the embodiment of the present invention, an OFDM signal obtained by modulating a common packet sequence configured from a packet common to a plurality of streams and a data packet sequence configured from a plurality of packets individually unique to the plural streams is received. Then, using predetermined time indicated by additional information added to particular packets of the common packet sequence and the data packet sequence obtained by demodulating the received OFDM signal as a reference, elapsed time after the predetermined time is counted. Then, the counted time and time indicated by the additional information added to the particular packets of the common packet sequence and the data packet sequence are compared with each other to detect a displacement in the time direction between the packets. Then, the displacement between the packets of the common packet sequence and the data packet sequence in the time direction is corrected based on a result of the detection.

According to another embodiment of the present invention, there is provided a reception system, including:

acquisition means for acquiring, through a transmission line, an OFDM (Orthogonal Frequency Division Multiplexed) signal obtained by modulating a common packet sequence configured from a packet common to a plurality of streams and a data packet sequence configured from a plurality of packets individually unique to the plural streams; and a transmission line decoding processing section adapted to carry out a transmission line decoding process including at least a decoding process of the packet streams for the OFDM signal acquired through the transmission line;

the transmission line decoding processing section including time counting means for counting, using predetermined time indicated by additional information added to particular packets of the common packet sequence and the data packet sequence obtained by demodulating the OFDM signal acquired through the transmission line as a reference, elapsed time after the predetermined time, detection means for comparing the counted time and time indicated by the additional information added to the particular packets of the common packet sequence and the data packet sequence with each other to detect a displacement in the time direction between the packets, and correction means for correcting the displacement between the packets of the common packet sequence and the data packet sequence in the time direction based on a result of the detection.

According to further embodiment of the present invention, there is provided a reception system, including:

a transmission line decoding processing section adapted to carry out, for an OFDM (Orthogonal Frequency Division Multiplexed) signal obtained by modulating a common packet sequence configured from a packet common to a plurality of streams and a data packet sequence configured from a plurality of packets individually unique to the plural streams and acquired through a transmission line, a transmission line decoding process including at least a decoding process of the packet streams; and an information source decoding processing section adapted to carry out, for the signal for which the transmission line decoding process is carried out, an information source decoding process including at least a process of decompressing compressed information into original information;

the transmission line decoding processing section including time counting means for counting, using predetermined time indicated by additional information added to particular packets of the common packet sequence and the data packet sequence obtained by demodulating the OFDM signal acquired through the transmission line as a reference, elapsed time after the predetermined time, detection means for comparing the counted time and time indicated by the additional information added to the particular packets of the common packet sequence and the data packet sequence with each other to detect a displacement in the time direction between the packets, and correction means for correcting the displacement between the packets of the common packet sequence and the data packet sequence in the time direction based on a result of the detection.

According to still further embodiment of the present invention, there is provided a reception system, including:

a transmission line decoding processing section adapted to carry out, for an OFDM (Orthogonal Frequency Division Multiplexed) signal obtained by modulating a common packet sequence configured from a packet common to a plurality of streams and a data packet sequence configured from a plurality of packets individually unique to the plural streams and acquired through a transmission line, a transmission line decoding process including at least a decoding process of the packet streams; and an outputting section adapted to output an image or sound based on the signal for which the transmission line decoding process is carried out;

the transmission line decoding processing section including time counting means for counting, using predetermined time indicated by additional information added to particular packets of the common packet sequence and the data packet sequence obtained by demodulating the OFDM signal acquired through the transmission line as a reference, elapsed time after the predetermined time, detection means for comparing the counted time and time indicated by the additional information added to the particular packets of the common packet sequence and the data packet sequence with each other to detect a displacement in the time direction between the packets, and correction means for correcting the displacement between the packets of the common packet sequence and the data packet sequence in the time direction based on a result of the detection.

According to still further embodiment of the present invention, there is provided a reception system, including:

a transmission line decoding processing section adapted to carry out, for an OFDM (Orthogonal Frequency Division Multiplexed) signal obtained by modulating a common packet sequence configured from a packet common to a plurality of streams and a data packet sequence configured from a plurality of packets individually unique to the plural streams and acquired through a transmission line, a transmission line decoding process including at least a decoding process of the packet streams; and a recording section adapted to record the signal for which the transmission line decoding process is carried out;

the transmission line decoding processing section including time counting means for counting, using predetermined time indicated by additional information added to particular packets of the common packet sequence and the data packet sequence obtained by demodulating the OFDM signal acquired through the transmission line as a reference, elapsed time after the predetermined time, detection means for comparing the counted time and time indicated by the additional information added to the particular packets of the common packet sequence and the data packet sequence with each other to detect a displacement in the time direction between the packets, and correction means for correcting the displacement between the packets of the common packet sequence and the data packet sequence in the time direction based on a result of the detection.

In the reception systems, using predetermined time indicated by additional information added to particular packets of a common packet sequence configured from a packet common to a plurality of streams and a data packet sequence configured from a plurality of packets individually unique to the plural streams both obtained by demodulating an OFDM signal, elapsed time after the predetermined time is counted. Then, the counted time and time indicated by the additional information added to the particular packets of the common packet sequence and the data packet sequence are compared with each other to detect a displacement in the time direction between the packets. Then, the displacement between the packets of the common packet sequence and the data packet sequence in the time direction is corrected based on a result of the detection.

The reception apparatus may be an independent apparatus or an internal block which composes one apparatus.

The program can be provided by transmission thereof through a transmission medium or in the form of a recording medium in or on which it is recorded.

In summary, according to the present invention, re-establishment of synchronism can be carried out rapidly.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENTS

In the following, preferred embodiments of the present invention are described with reference to the accompanying drawings.

Outline of the General Configuration

Figure 1:
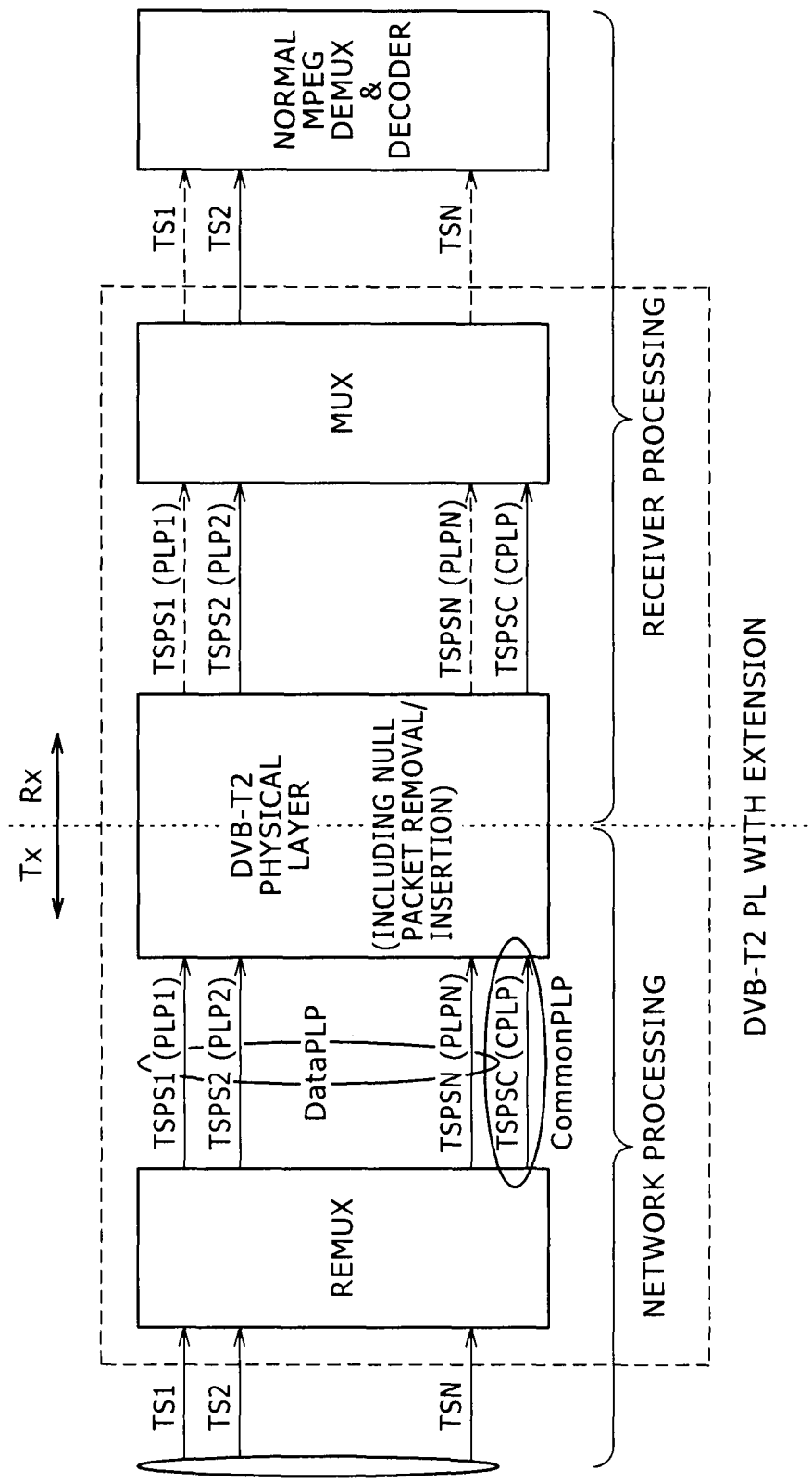
FIG. 1 is a block diagram showing a general configuration of a transmitter and a receiver where the M-PLP method is used in DVB-T.2.

FIG. 1 shows an outline of a configuration of a transmitter (Tx) and a receiver (Rx) in the case where the M-PLP system is used in DVB-T.2.

Referring to FIG. 1, the transmitter side operates in the following manner. In particular, when a plurality of TSs such as TSs TS1 to TSN in FIG. 1 are inputted at a fixed bit rate, common packets are extracted from packets which configure the TSs to produce a packet sequence (TSPSC (CPLP) in FIG. 1) which is called Common PLP. Further, the TSs from which the common packets are extracted called Data PLPs such as packet sequences TSPS1 (PLP1) to TSPSN (PLPN).

In particular, on the transmitter side, N Data PLPs and one Common PLP are produced from N TSs. Consequently, an encoding ratio in error correction and a modulation system such as the OFDM system can be applied adaptively to each PLP. It is to be noted that, in the case where the term PLP is used solely in the description of the present embodiment, it includes both of the Common PLP and a Data PLP. Further, in the case where the term Common PLP and the term Data PLP are used, they include significance of individual packets which configure the Common PLP and the Data PLP.

For example, in the case of a TS (Transport Stream) packet of MPEG, some of a plurality of Data PLPs include the same information like control information such as an SDT (Service Description Table) or an EIT (Event Information Table) or the like. By cutting out and transmitting such common information as a Common PLP, drop of the transmission efficiency can be prevented.

On the other hand, the receiver side demodulates a plurality of Data PLPs (TSPS1 (PLP1) to TSPSN (PLPN) in FIG. 1) and Common PLP (TSPSC(CPLP) in FIG. 1) received thereby using a demodulation system such as the OFDM system. Then, the receiver side extracts only a desired PLP (TSPS2 (PLP2) in FIG. 1) and carries out an error correction process for the PLP. By this, a desired TS can be reconstructed.

For example, if the Data PLP TSPS2 (PLP2) is selected from among the Data PLPs TSPS1 (PLP1) to TSPSN (PLPN) as seen in FIG. 1, then the TS TS2 is reconstructed using the Data PLP TSPS2 (PLP2) and the Common PLP TSPSC (CPLP). Therefore, if one Data PLP and the common PLP are extracted, then the TS can be reconstructed, and consequently, there is such a merit that the operation efficiency of the receiver is improved.

Then, the TS reconstructed by the receiver side is outputted to a decoder on the succeeding stage. The decoder applies, for example, MPEG decoding to decode coded data included in the TS and outputs data of an image or sound obtained as a result of the MPEG decoding.

As described above, if the M-PLP system is used in DVB-T.2, then on the transmitter Tx side, N Data PLPs and one Common PLP are produced from N TSs and transmitted. On the receiver Rx side, a desired TS is reconstructed or re-produced from a desired Data PLP and the one Common PLP. Example of the Configuration of the Reception Apparatus FIG. 2 shows a configuration of a reception apparatus to which the present invention is applied.

Figure 2:
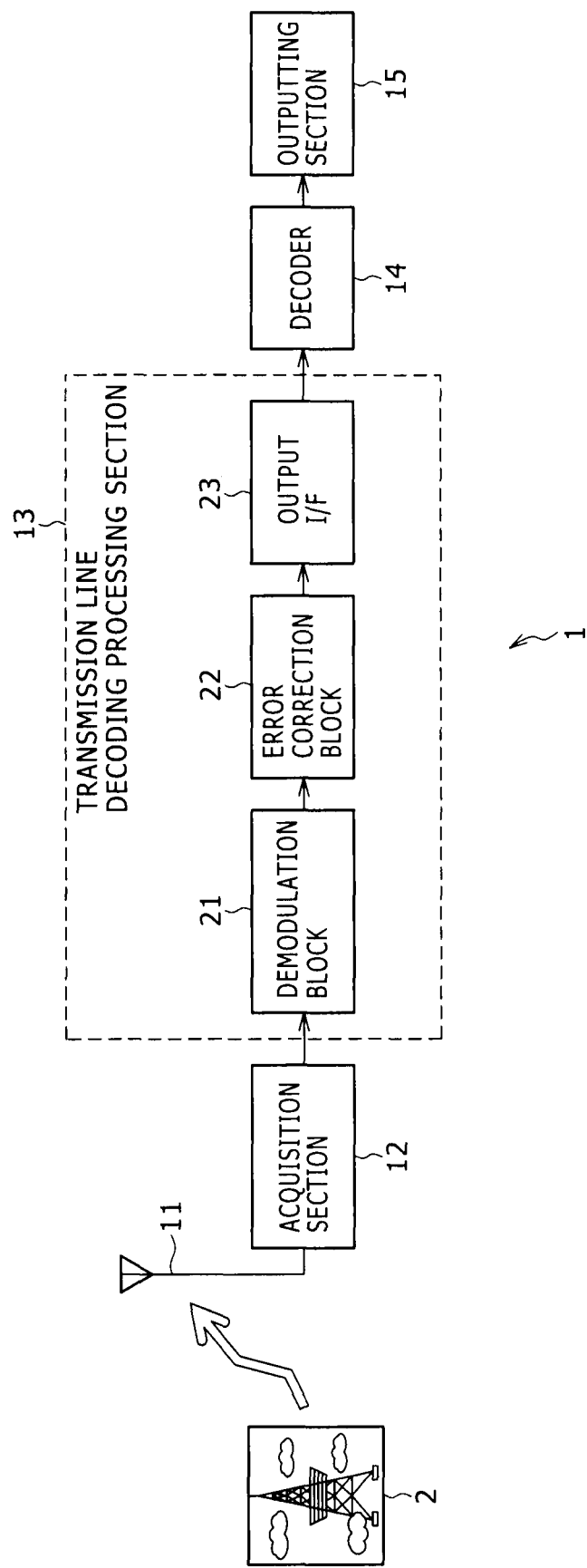
FIG. 2 is a block diagram showing a configuration of a reception apparatus to which the present invention is applied.

It is to be noted that, in FIG. 2, the reception apparatus 1 corresponds to the receiver Rx shown in FIG. 1, and a transmission apparatus 2 corresponds to the transmitter Tx shown in FIG. 1.

The reception apparatus 1 of FIG. 2 receives a signal of digital broadcasting transmitted thereto from the transmission apparatus 2. This signal is an OFDM signal which is obtained by applying such processes as error correction and OFDM modulation to PLPs from TSs using the M-PLP system adopted as standards for terrestrial digital broadcasting of the next generation in DVB-T.2 which is being currently set.

In particular, the transmission apparatus 2, for example, in a broadcasting station transmits an OFDM signal of digital broadcasting through a transmission line. The reception apparatus 1 receives the OFDM signal transmitted thereto from the transmission apparatus 2, carries out a transmission line decoding process including a decoding process and an error correction process, and outputs decoded data obtained by the transmission line decoding process to the succeeding stage.

Referring to FIG. 2, the reception apparatus 1 includes an antenna 11, an acquisition section 12, a transmission line decoding processing section 13, a decoder 14 and an outputting section 15.

The antenna 11 receives the OFDM signal transmitted thereto from the transmission apparatus 2 through the transmission line and supplies the received OFDM signal to the acquisition section 12.

The acquisition section 12 is configured, for example, from a tuner, a set top box (STB) or the like, and carries out frequency conversion to convert the OFDM signal in the form of a RF signal received by the antenna 11 into an IF (Intermediate Frequency) signal. The acquisition section 12 supplies the IF signal to the transmission line decoding processing section 13.

The transmission line decoding processing section 13 carries out necessary processes such as demodulation and error correction for the OFDM signal from the acquisition section 12, reconstructs a TS from PLPs obtained by the processes and supplies the TS to the decoder 14.

The transmission line decoding processing section 13 includes a demodulation block 21, an error correction block 22 and an output interface (I/F) 23.

The demodulation block 21 carries out a demodulation process for the OFDM signal from the acquisition section 12 and outputs desired Data PLPs and one Common PLP obtained as a decoded signal by the demodulation process to the error correction block 22.

The error correction block 22 carries out a predetermined error correction process for the PLPs of the demodulation signal obtained from the demodulation block 21 and outputs PLPs obtained by the error correction process to the output I/F 23.

It is to be noted here that, by the transmission apparatus 2, for example, data of an image and sound as a broadcasting program are encoded by MPEG (Moving Picture Experts Group) encoding, and PLPs produced from a TS configured from TS packets in which the MPEG encoded data are included are transmitted as an OFDM signal.

Further, by the transmission apparatus 2, PLPs are encoded into codes such as, for example, RS (Reed Solomon) codes or LDPC (Low Density Parity Check) codes as a countermeasure against errors which may appear on the transmission line. Accordingly, the error correction block 22 carries out a process of decoding the codes as an error correction encoding process.

The output I/F 23 reconstructs a TS from the PLPs supplied thereto from the error correction block 22 and carries out an outputting process of outputting the reconstructed TS at a predetermined fixed rate (hereinafter referred to as TS rate) to the outside. It is to be noted that details of the configuration of the output I/F 23 are hereinafter described with reference to FIG. 3.

The decoder 14 carries out MPEG decoding of the coded data included in the TS supplied thereto from the output I/F 23 and supplies data of an image and sound obtained by the MPEG decoding to the outputting section 15.

The outputting section 15 is configured, for example, from a display unit and a speaker, and displays an image and outputs sound based on the data of an image and sound supplied thereto from the decoder 14.

The reception apparatus 1 is configured in such a manner as described above.
Detailed Example of the Configuration of the Output I/F FIG. 3 shows an example of a configuration of the output I/F 23 shown in FIG. 2.

Figure 3:
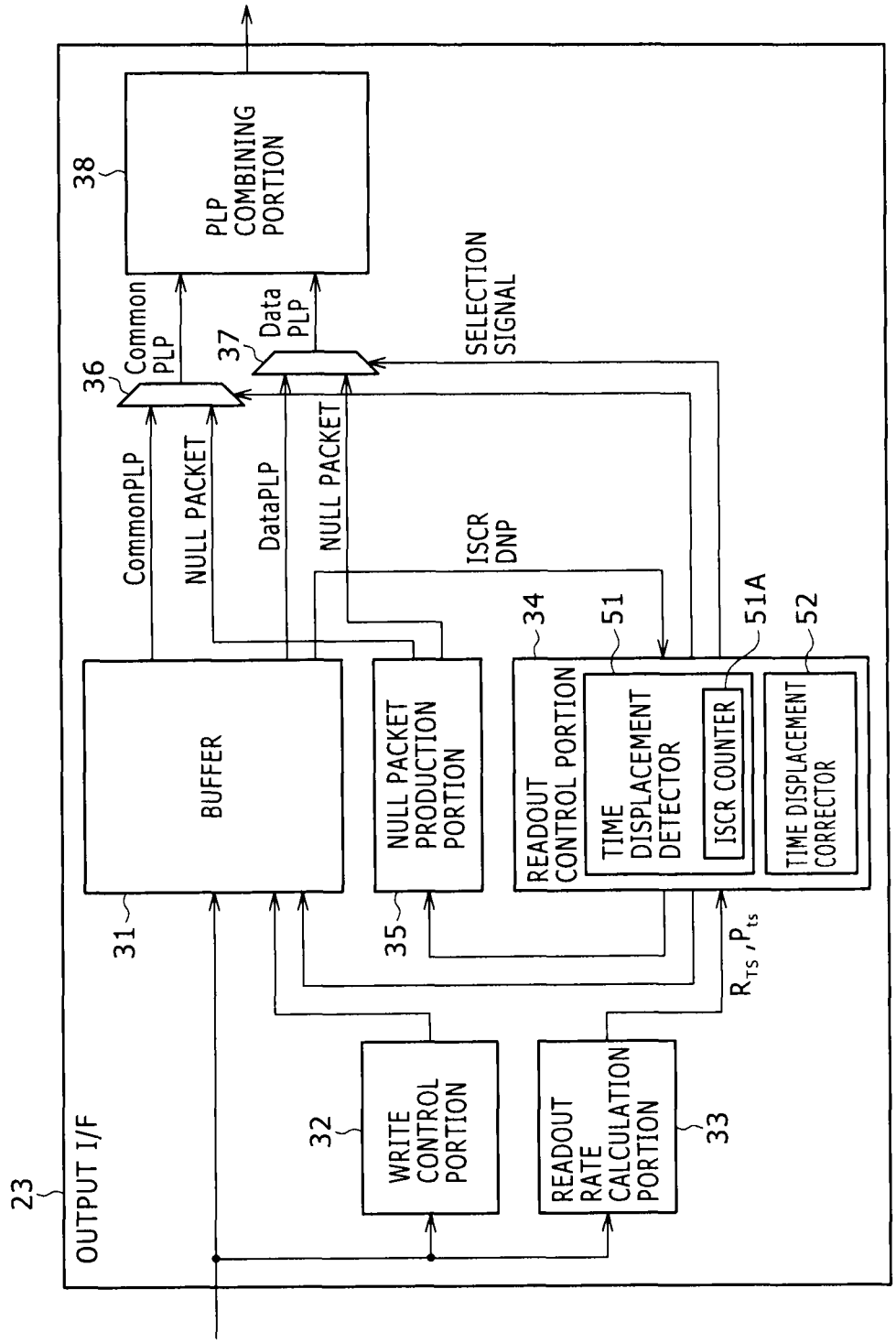
FIG. 3 is a block diagram showing an example of a configuration of an output I/F shown in FIG. 2.

Referring to FIG. 3, the output I/F 23 includes a buffer 31, a write control portion 32, a readout rate calculation portion 33, a readout control portion 34, a Null packet production portion 35, a selector 36, another selector 37 and a PLP combining portion 38.

PLPs supplied from the error correction block 22, that is, a common PLP and Data PLPs, are supplied to the buffer 31, write control portion 32, and readout rate calculation portion 33.

The buffer 31 successively accumulates the PLPs supplied thereto from the error correction block 22 under the writing control of the write control portion 32. Further, the buffer 31 supplies the Common PLPs from among the PLPs accumulated therein to the selector 36 and supplies the Data PLPs to the selector 37 under the reading control of the readout control portion 34.

The write control portion 32 carries out writing address control to the buffer 31 based on the information regarding the PLPs supplied thereto from the TTO synchronism detection portion 30 to accumulate the PLPs into the buffer 31.

Figure 10:
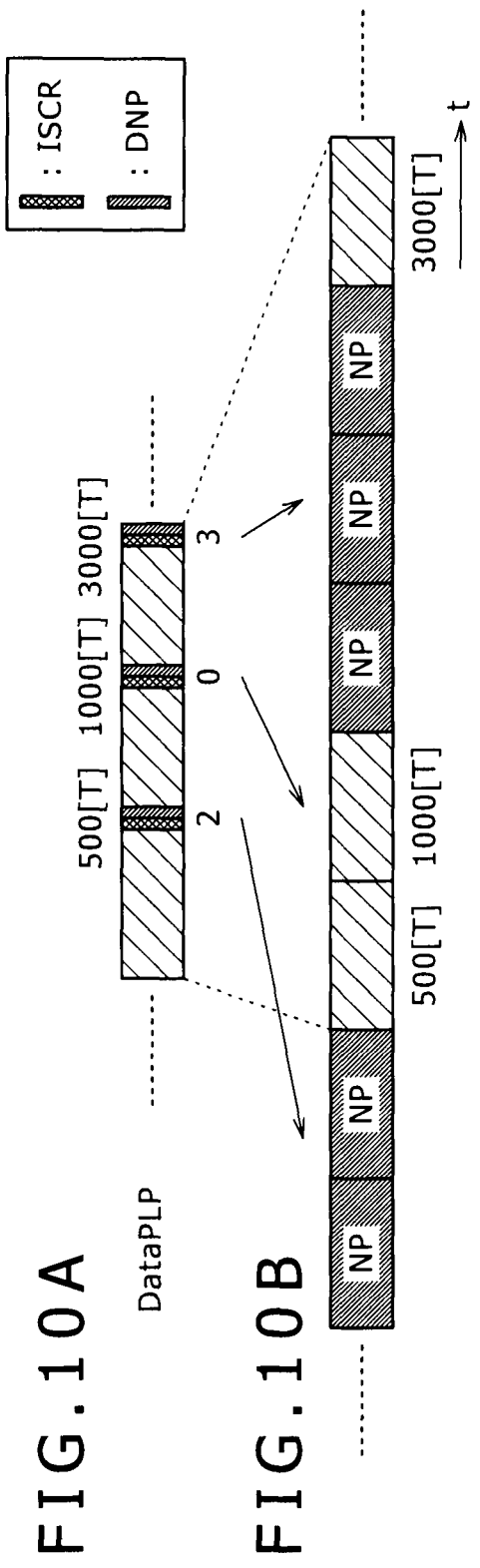
FIGS. 10A and 10B are diagrammatic views illustrating a calculation method of a TS rate.

The readout rate calculation portion 33 calculates a packet rate $P_{ts}$ which is a period of time per one packet and a TS rate $R_{TS}$ based on the PLPs supplied thereto from the error correction block 22 and supplies the calculated packet rate $P_{ts}$ and TS rate $R_{TS}$ to the readout control portion 34. Details of the calculation process of the packet rate $P_{ts}$ and the TS rate $R_{TS}$ carried out by the readout rate calculation portion 33 are hereinafter described with reference to FIG. 10.

The readout control portion 34 carries out address control of the buffer 31 so that a TS reconstructed from the PLPs read out from the buffer 31 may be outputted in accordance with the TS rate supplied thereto from the readout rate calculation portion 33.

In particular, the readout control portion 34 detects a combination of a Common PLP and a Data PLP whose readout timings are in synchronism with each other from among the Common PLPs and the Data PLPs stored in the buffer 31 and then supplies the PLPs synchronized with each other to the PLP synthesis portion 38. Further, at this time, since an information called a DNP (Deleted Null Pockaet) is sometimes added to the TS packets, the readout control portion 34 controls the selectors 36 and 37 so that a number of Null packets corresponding to the value of the DNP may be supplied to the PLP combining portion 38.

Meanwhile, DNP is information (signaling value) which is added when the output I/F 23 operates in a mode called Null packet deletion mode hereinafter described, and successive Null packets are transmitted with a signal of one byte formed from the number of successive Null packets.

The Null packet production portion 35 produces and supplies Null packets to the selectors 36 and 37 under the control of the readout control portion 34.

Also, the readout control portion 34 carries out a process of re-establishing, when synchronism between a Common PLP and a Data PLP is lost, synchronism between the PLPs. In order to carry out the re-synchronization process, a time displacement detector 51 and a time displacement corrector 52 are provided in the readout control portion 34.

The time displacement detector 51 detects displacement in a time direction between the Common PLP and the Data PLP read out from the buffer 31 when predetermined information is used as a reference, and outputs a result of the detection to the time displacement corrector 52.

As the detection method in this instance, an ISCR counter 51A provided in the time displacement detector 51 for counting elapsed time after predetermined time determined as a reference is used. In particular, the time displacement detector 51 causes the ISCR counter 51A to count time, which is relative time to reference time described below and is hereinafter referred to as relative time, obtained by successively adding a predetermined period of time such as, for example, a packet rate $P_{ts}$ calculated by the readout rate calculation portion 33 to time (hereinafter referred to as reference time) obtained from an ISCR used as a reference from within ISCRs (additional information) added to the TS packet. Then, the time displacement detector 51 compares the counted relative time and time (hereinafter referred to as additional time) obtained from an ISCR later in time with respect to the reference ISCR with each other to detect displacement in time.

It is to be noted that, while details are hereinafter described, the ISCR (Input Stream Time Reference) is a kind of ISSY (Input Stream Synchronizer) which is additional information (signaling value) to be added in a unit of a TS packet and is information (additional information) which indicates a timestamp added on the transmission apparatus 2 side upon transmission of the TS packet.

The time displacement corrector 52 corrects displacement in the time direction between the Common PLP and the Data PLP stored in the buffer 31 based on a result of the detection by the time displacement detector 51. In particular, by the correction of the displacement in the time direction, the readout timings of the packets of the Common PLP and the Data PLP are corrected.

For the correction method, the selectors 36 and 37 which can individually select one of a TS packet of a PLP and a Null packet are provided between the buffer 31 for outputting a Common PLP and a Data PLP and the PLP synthesis portion 38 for combining the Common PLP and the Data PLP with each other, and the correction method is carried out by controlling the selectors 36 and 37. In particular, not only the ISSY described above but also a DNP are added to the TS packet, and a Null packet is represented with one-bite information by the DNP. The time displacement corrector 52 adjusts the number of Null packets represented by the DNP to correct displacement in the time direction between the PLPs. A selection signal for carrying out such adjustment as just described is supplied from the time displacement corrector 52 to the selector 36 or the selector 37.

Details of the re-synchronization process carried out by the time displacement detector 51 and time displacement corrector 52 are hereinafter described with reference to FIGS. 12 and 14.

The selector 36 selects one of a TS packet of a Common PLP from the buffer 31 and a Null packet from the Null packet production portion 35 in response to a selection signal from the time displacement corrector 52 to be supplied to the PLP combining portion 38. Similarly, the selector 37 selects one of a TS packet of a Data PLP and a Null packet and supplies the selected packet to the PLP combining portion 38.

To the PLP combining portion 38, a Common PLP supplied from the selector 36 and a Data PLP supplied from the selector 37 are inputted in synchronism with each other. The PLP combining portion 38 combines the PLPs to reconstruct a TS and supplies the TS at the TS rate to the decoder 14.

The output I/F 23 is configured in such a manner as described above.

Processing of the Transmission Apparatus

Now, details of transmission and reception processes carried out between the reception apparatus 1 and the transmission apparatus 2 are described with reference to FIGS. 4 to 14. Here, processing carried out by the transmission apparatus 2 is described first with reference to FIGS. 4 to 6, and then processing carried out by the reception apparatus 1 is described with reference to FIGS. 7 to 14.

It is to be noted that, in the description of the transmission and reception processes given below, it is assumed for simplified description that four TSs TS1 to TS4 are inputted to the transmission apparatus 2 and PLPs produced from the TSs are subjected to such processes as error correction and OFDM modulation and then transmitted to the reception apparatus 1.

Figure 4:
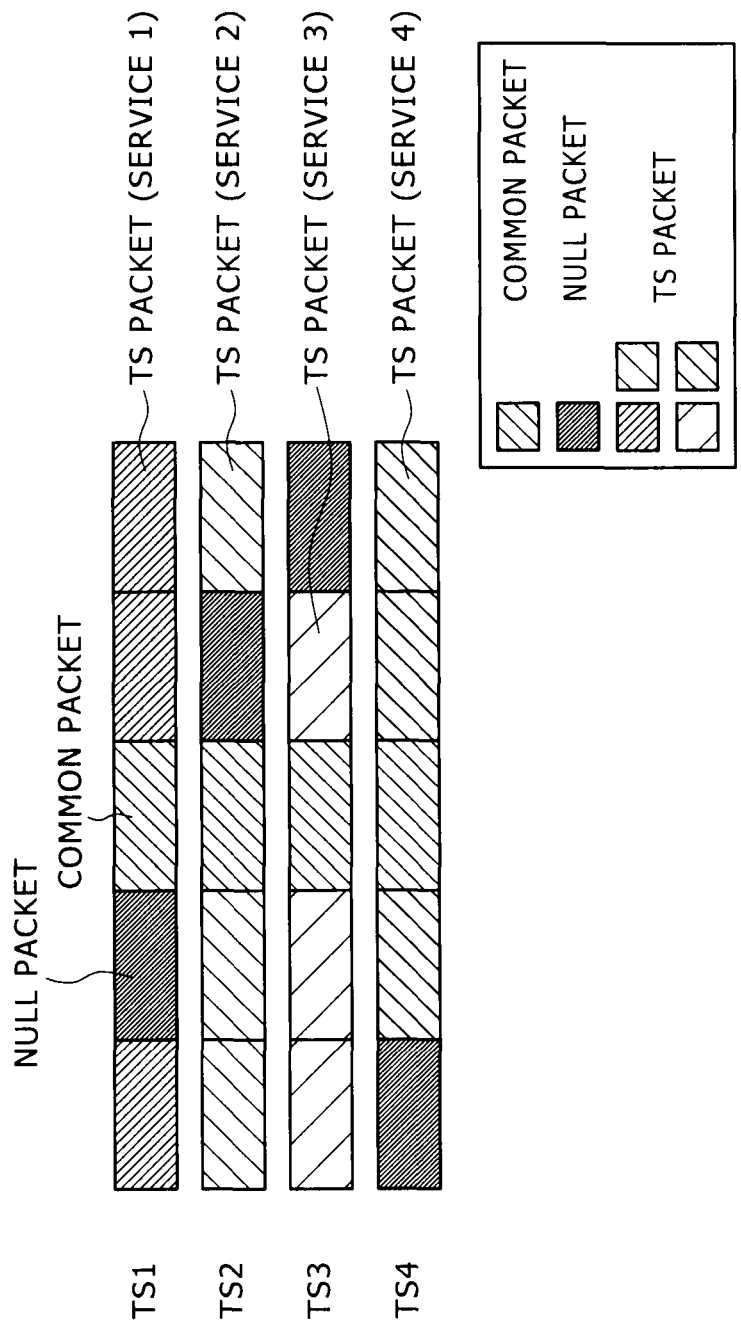
FIG. 4 is a diagrammatic view illustrating a configuration of packets on the transmission side.

Referring first to FIG. 4, five rectangles of each of the TSs TS1 to TS4 individually represent packets. In the present embodiments, the packets which configure each TS are classified into three different packets including a TS packet, a Null packet and a common packet.

The TS packet contains data for proving various services, which are, in FIG. 4, services 1 to 4, such as, for example, MPEG encode data. Meanwhile, the Null packet contains data for adjustment which are transmitted in order to keep the amount information, which is to be outputted from the transmission side, fixed when the transmission side has no data to be transmitted. For example, the Null packet prescribed in MPEG is a TS packet which has 0x47, 0x1F, 0xFF and 0x1F as four bytes at the top thereof, and all is are adopted for the bits of the payload.

The common packet contains data which are common to a plurality of TSs. For example, in the case of MPEG, control information such as the SDT and the EIT described hereinabove corresponds to the common packet.

In particular, in the example of FIG. 4, the third packet from the left in the figure from among the five packets which configure each of the TSs TS1 to TS4 is a common packet. Since the common packets contain the same information, they are extracted as a common PLP as seen in FIG. 5.

Figure 5:
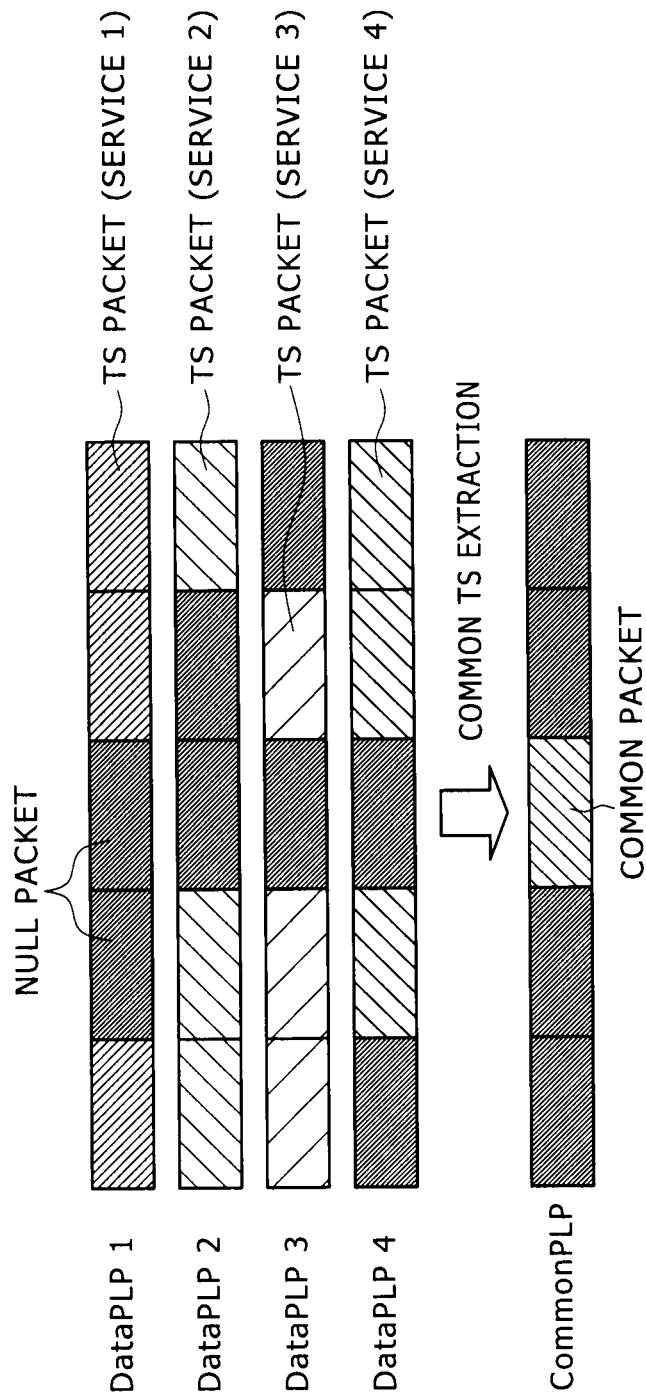
FIG. 5 is a similar view but illustrating a configuration of a Common PLP and a Data PLP on the transmission side.

In particular, if the TSs TS1 to TS4 of FIG. 4 contain a common packet, then the common packet is extracted as the Common PLP as seen in FIG. 5, and the extracted common packets are replaced by Null packets. Then, each of the TSs from which the common packet is extracted makes a sequence called Data PLP, that is, one of sequences Data PLP1 to Data PLP4.

In the case where the transmission apparatus 2 is operating in a mode called Null packet deletion mode, a Null packet is transmitted in the form of a signal (signaling) of 1 byte called DNP.

Figure 6:
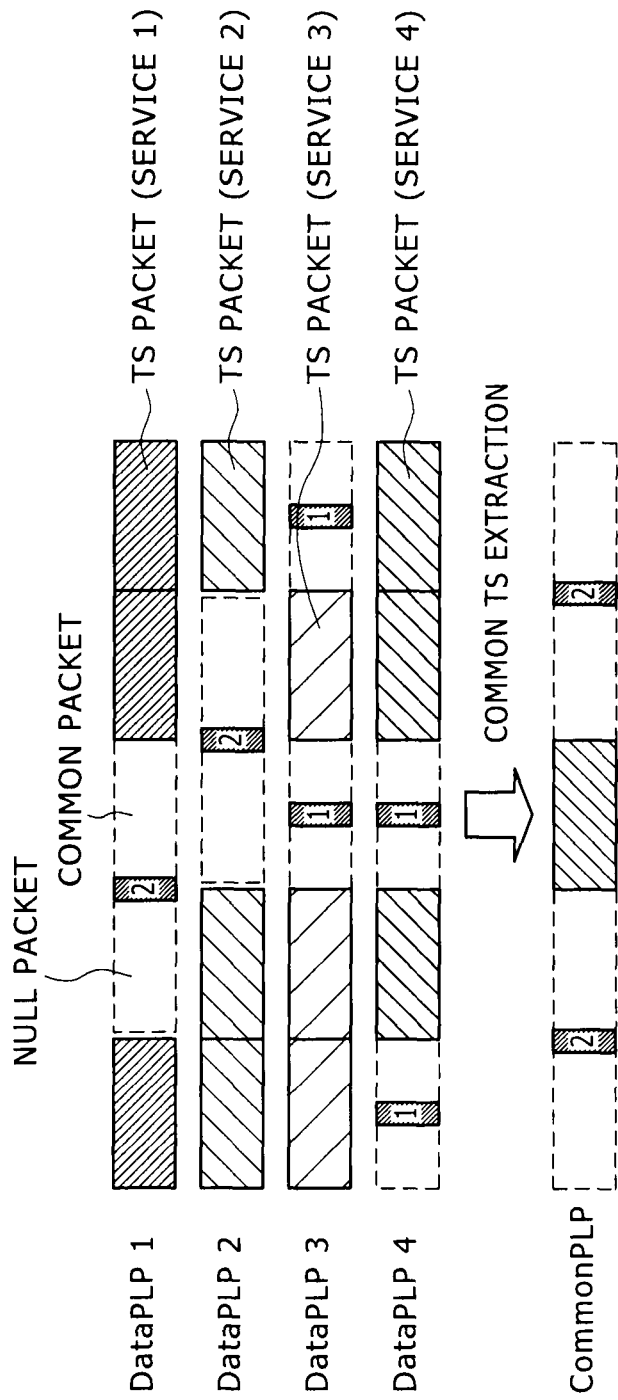
FIG. 6 is a similar view but illustrating a configuration of a Common PLP and a Data PLP in a Null packet deletion mode on the transmission side.

For example, in the sequence Data PLP1 illustrated in FIG. 5, the second and third packets from the left in the figure are Null packets, and in the case where two Null packets successively appear, they are replaced by a signal of 1 byte which has the value of 2 as seen in FIG. 6. In other words, the value of the DNP corresponds to the number of successively appearing Null packets. For example, in the sequence Data PLP3 shown in FIG. 5, since each of the third and fifth packets from the left in FIG. 5 is a Null packet by itself, each of them is replaced by a signal of 1 byte having the value of 1 as seen in FIG. 6.

If each Null packet is replaced by the DNP of 1 byte, then the sequences Data PLP1 to Data PLP4 and the common PLP illustrated in FIG. 5 come to have such a state as illustrated in FIG. 6. Consequently, the transmission apparatus 2 produces the sequences Data PLP1 to Data PLP4 and the common PLP.

In this manner, the transmission apparatus 2 produces four Data PLPs and one Common PLP from four TSs and carries out predetermined processes such as error correction and OFDM modulation for the produced signals. Then, the OFDM signal obtained by the predetermined processes is transmitted to the reception apparatus 1 through a predetermined transmission line.

Processing of the Reception Apparatus

Now, processing of the reception apparatus 1 is described with reference to FIGS. 7 to 14.

It is to be noted that it is assumed that an OFDM signal received by the reception apparatus 1 has been subjected to such processes as error correction and OFDM modulation in regard to the sequences Data PLP1 to Data PLP4 and the Common PLP of FIG. 6 in accordance with the processes of the transmission apparatus 2.

Figure 7:
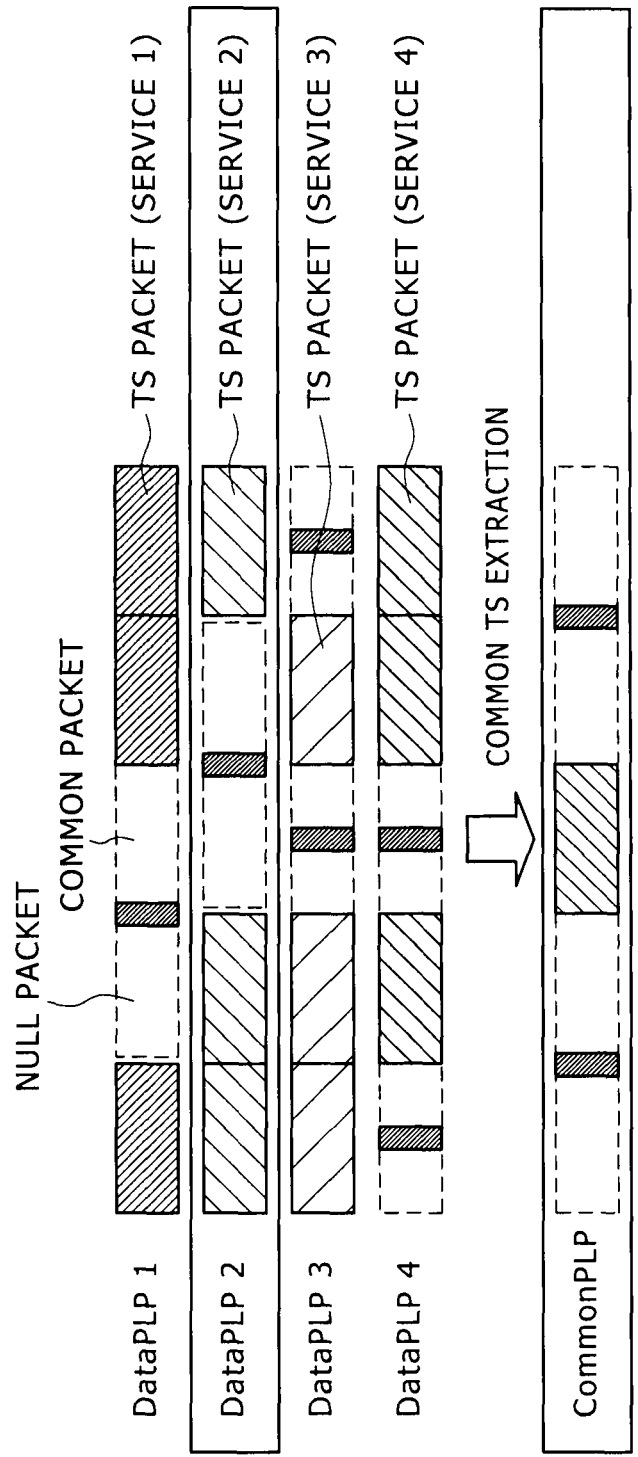
FIG. 7 is a similar view but illustrating a configuration of a Common PLP and a Data PLP on the reception side.

The reception apparatus 1 receives an OFDM signal transmitted thereto from the transmission apparatus 2 through the predetermined transmission line, and the demodulation block 21 carries out predetermined processing such as OFDM demodulation for the OFDM signal to acquire sequences Data PLP1 to Data PLP4 and a Common PLP illustrated in FIG. 7 corresponding to the sequences Data PLP1 to Data PLP4 and the Common PLP illustrated in FIG. 6, respectively. Then, for example, if the service 2 is selected by a user operation, then the sequence Data PLP2 from among the sequences Data PLP1 to Data PLP4 is extracted. The extracted sequence Data PLP2 and the Common PLP are subjected to predetermined processes such as error correction by the error correction block 22 and inputted to the output I/F 23.

Figure 8:
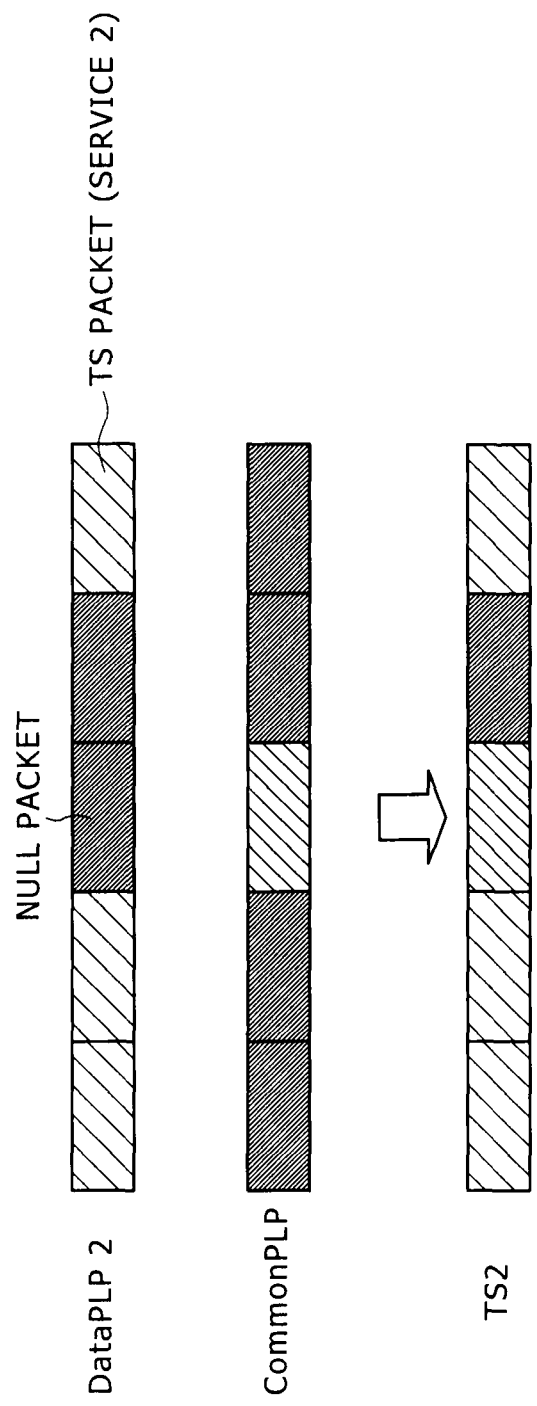
FIG. 8 is a diagrammatic view illustrating a reconstruction method of a TS on the reception side.

In particular, only the sequence Data PLP2 and the Common PLP corresponding to the sequence Data PLP2 which are individually surrounded by thick frameworks in FIG. 7 are inputted to the output I/F 23. Then, the output I/F 23 processes the sequence Data PLP2 and the Common PLP inputted thereto such that a Null packet included in the sequence Data PLP2 is replaced by the common packet included in the corresponding Common PLP. Consequently, the original TS TS2 similar to the TS TS2 illustrated in FIG. 4 is reconstructed as shown in FIG. 8.

Figure 9:
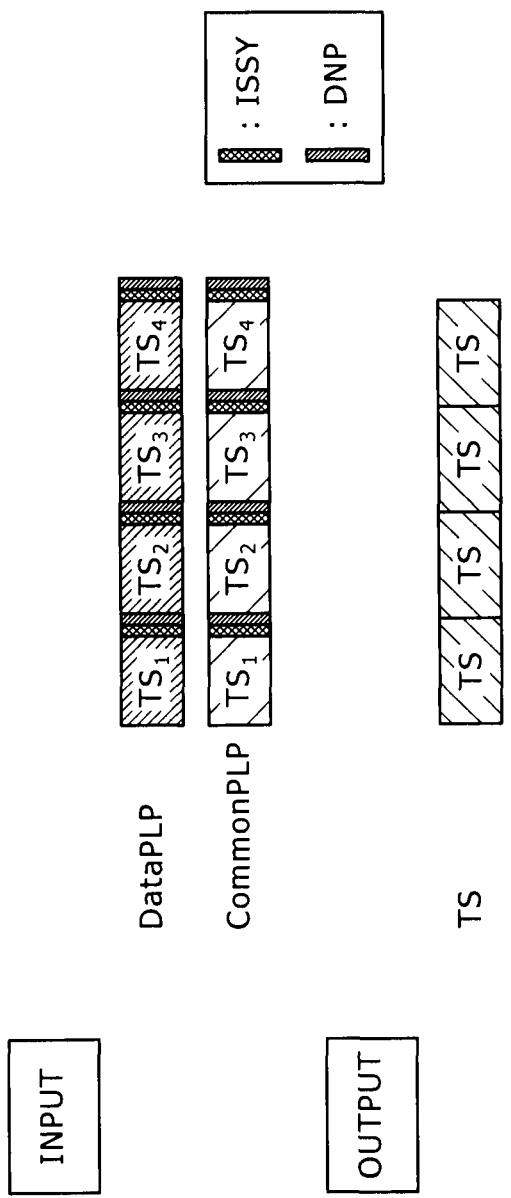
FIG. 9 is a diagrammatic view illustrating details of the reconstruction method of a TS on the reception side.

FIG. 9 illustrates details of a desired Data PLP, particularly the sequence Data PLP2, and a Common PLP inputted to the output I/F 23 and a TS outputted from the output I/F 23.

Referring to FIG. 9, the Data PLP and the Common PLP inputted to the output I/F 23 have a DNP and information called ISSY (additional information) added thereto in a unit of a TS packet as described hereinabove.

This ISSY includes an information, that is, additional information, such as BUFS (Buffer Size) or TTO (Time to Output) in addition to the ISCR described hereinabove. The BUFS is an information representative of a required buffer amount for a PLP. Reference to this information makes it possible to determine the buffer region. The TTO is an information representative of a period of time until a TS packet is outputted from the top of the P1 symbol disposed in a T2 frame in which the TS packet is being processed.

Meanwhile, the DNP is an information, that is, additional information, added in the case where the transmission apparatus 2 is operating in the Null packet deletion mode. For example, in the case where DNP=3, the reception apparatus 1 can discriminate that three Null packets will appear successively and can therefore reconstruct the original packet sequence including the Null packets.

The output I/F 23 uses such information as just mentioned obtained from the PLPs to detect a combination of two packets synchronized with each other from within the Data PLP and the Common PLP and adjusts the timings of the Data PLP and the Common PLP to synchronize them with each other.

In particular, the readout rate calculation portion 33 in the output I/F 23 uses the DNP added to the Data PLP to reconstruct the original packet sequence from the Data PLP and reads the ISCR added to the TS packet. Consequently, the readout rate calculation portion 33 can determine the rate at which the TS is to be outputted, that is, the TS rate, from the following expression (1):

$$\text{Rate} = \frac{\text{N\_bits} \times (\text{N\_packets} + \Sigma DNP)}{(\text{ISCR\_b} - \text{ISCR\_a}) \times T} \tag{1}$$

where N_bits is the bit number per one packet, and, for example, 1504 (bits/packet) is substituted into N_bits. Meanwhile, T is the unit of an elementary period, and, for example, in the case of the 8 MHz band, such a value as 7/64 us is substituted into T.

FIGS. 10A and 10B illustrate an example of calculation of a TS rate executed by the readout rate calculation portion 33. It is to be noted that, in FIGS. 10A and 10B, the time advances from the left toward the right as indicated by an arrow mark on the bottom of FIG. 10B.

As seen in FIG. 10A, TS packets and DNPs and ISCRs which are added to the individual TS packets are inputted as a Data PLP to the readout rate calculation portion 33. In the case of the present example, the DNP added to the first TS packet from the right in FIG. 10A indicates 3, and the ISCR indicates 3000 [T]. Similarly, the DNP of the second TS packet indicates 0 and the ISCR indicates 1000 [T], and the DNP of the third TS packet indicates 2 and the ISCR indicates 500 [T].

If the DNPs mentioned are used to place Null packets into the original state, then the Data PLP of FIG. 10A is converted into such a stream as seen in FIG. 10B. Referring to FIG. 10B, in the stream illustrated, three Null packets denoted by NP in FIG. 10B are placed next to the first TS packet and followed by the second and third TS packets, which are in turn followed by two Null packets.

Here, if the packet rate which is a period of time per one packet is represented by $P_{ts}$, then the packet rate $P_{ts}$ is determined in accordance with the following expression (2):

$$PacketRate = \frac{ISCR\_b - ISCR\_a}{N\_packets + \Sigma DNP} \quad (2)$$

Accordingly, in the case of the present example, $P_{ts}$=(ISCR_b−ISCR_a)/(N_packets+ΣDNP)=(3000 [T]−500 [T])/5 [packets]=500 [T/packet].

Then, if the TS rate is represented by $R_{TS}$, then the TS rate $R_{TS}$ is determined from the expression (1) given hereinabove and the packet rate $P_{ts}$ described above in the following manner:

$R_{TS}$=N_bits/$P_{ts}$×T=1504 [bits/packet]/500 [T/packet]×7/64[us]=27.5 [Mbps]

The packet rate $P_{ts}$ (=500 [T/packet]) and the TS rate $R_{TS}$ (=27.5 [Mbps]) calculated in this manner are supplied to the readout control portion 34.

Now, details of operation of the write control portion 32 and the readout control portion 34 into and from the buffer 31 are described with reference to FIG. 11.

Figure 11:
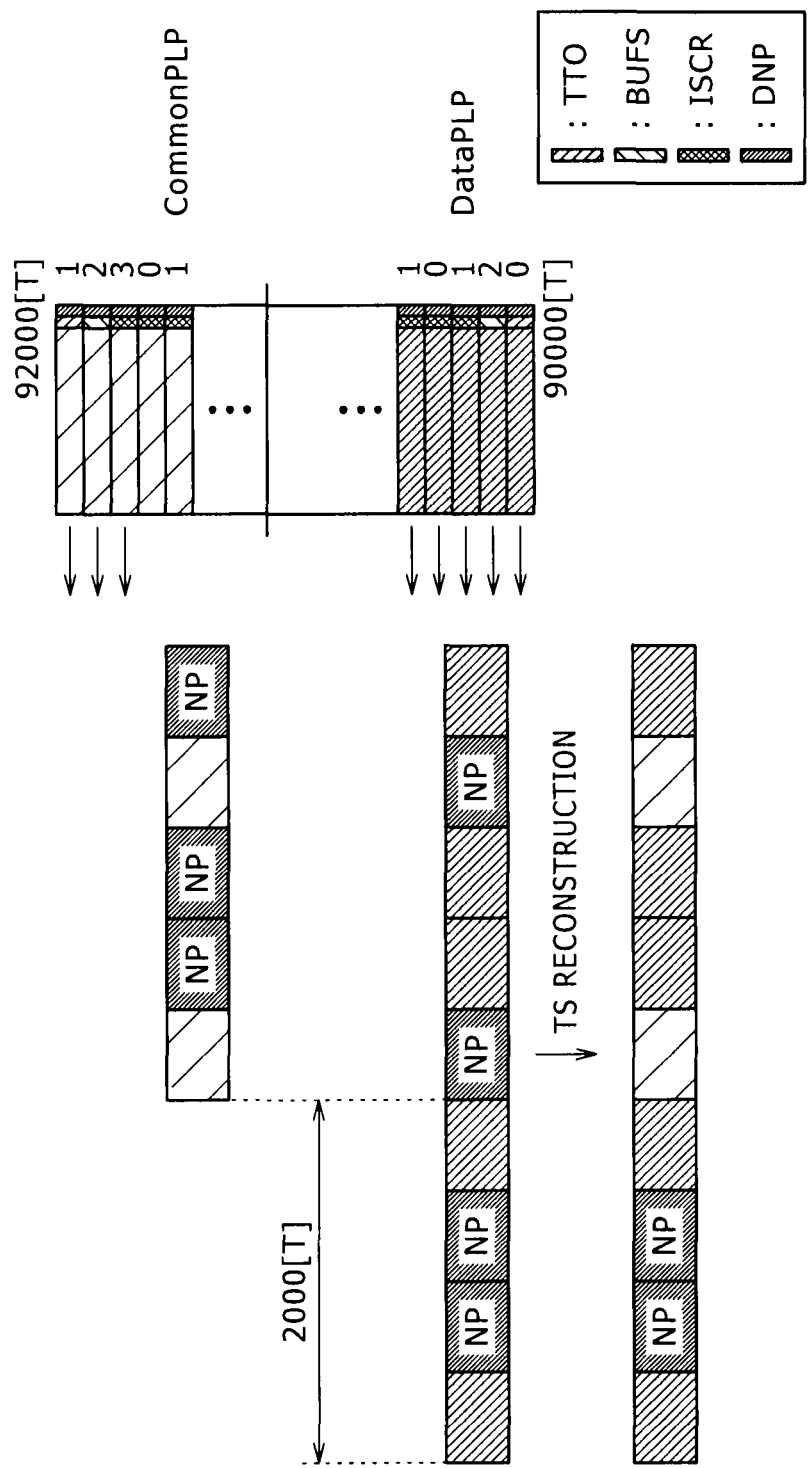
FIG. 11 is a diagrammatic view illustrating writing and readout timings of a buffer.

FIG. 11 illustrates timings of writing into and reading out from the buffer 31.

In the example of FIG. 11, a manner in which PLPs are successively accumulated into the buffer 31 is illustrated schematically. In this schematic view, a manner in which Common PLPs are successively accumulated from above to below in FIG. 11 is illustrated in an upper side region of FIG. 11 while a manner in which Data PLPs are successively accumulated from below to above in FIG. 11 is illustrated in a lower side region of FIG. 11.

In particular, in the example of FIG. 11, Common PLPs inputted to the output I/F 23 are successively stored into the buffer 31 under the control of the write control portion 32 such that five common packets (TS packets) illustrated in FIG. 11 are stored into a predetermined region on the upper side in FIG. 11 together with the ISSYs and the DNPs added thereto. As regards the ISSYs and the DNPs added to the common packets, in the example illustrated in FIG. 11, TTO 92000 [T] and DNP=1 are placed in the first common packet while BUFS and DNP=2 are placed in the second common packet. Further, in the third to fifth common packets, the DNP=3, 0, 1 are placed together with the ISCR, respectively.

Meanwhile, the inputted Data PLPs are successively stored into the buffer 31 under the control of the write control portion 32 such that five TS packets illustrated in FIG. 11 are stored into a predetermined region on the lower side in FIG. 11 together with the ISSYs and the DNPs added thereto. As regards the ISSYs and the DNPs added to the TS packets, TTO=90000 [T] and DNP=0 are placed in the first TS packet while BUFS and DNP=2 are placed in the second common packet. Meanwhile, in the third to fifth TS packets, DNP=1, 0, 1 are placed together with the ISCRs. It is to be noted that, while no particular value is described for BUFS and ISCR in the example of FIG. 11, actually predetermined values are allocated to the ISSYs similarly to the TTOs.

The Common PLPs and the Data PLPs are stored in such a manner as described above into the buffer 31. Then, the Common PLPs and the Data PLPs stored in the buffer 31 are read out under the control of the readout control portion 34. In the case of the example of FIG. 11, the TS packet at the top of the Data PLPs is read out later by 90000 [T] than the top of the P1 symbol using the value of the TTO, and the common packet at the top of the Common PLPs is read out later by 92000 [T] than the top of the P1 symbol, that is, after lapse of 2000 [T] after the TS packet at the top of the Data PLPs is read out.

In particular, while the readout control portion 34 reads out both of the Common PLPs and the Data PLPs from the buffer 31, it adjusts the output timings of the Common PLPs and the Data PLPs using the TTO. Then, if the readout control portion 34 detects a combination of a Common PLP and a Data PLP whose readout timings are synchronized with each other from the read out PLPs, then it replaces a Null packet placed in the Data PLP with the common packet of the Common PLP to reconstruct the original TS.

Synchronization which uses a TTO, that is, TTO synchronization, is carried out to reconstruct a TS in such a manner as described above. However, if a wrong signal is received from a cause of a reception channel environment or the like, then the synchronism between Common PLPs and Data PLPs is lost, resulting in the necessity for re-establishment of synchronism as described hereinabove. Thus, means for eliminating out-of-synchronism to re-establish synchronism, particularly the TTO information retainer 51 and the address corrector 52 shown in FIG. 3, are described with reference to FIGS. 12 to 14. It is to be noted that, in FIGS. 12 to 14, the direction of time is a direction from the left toward the right.

Figure 12:
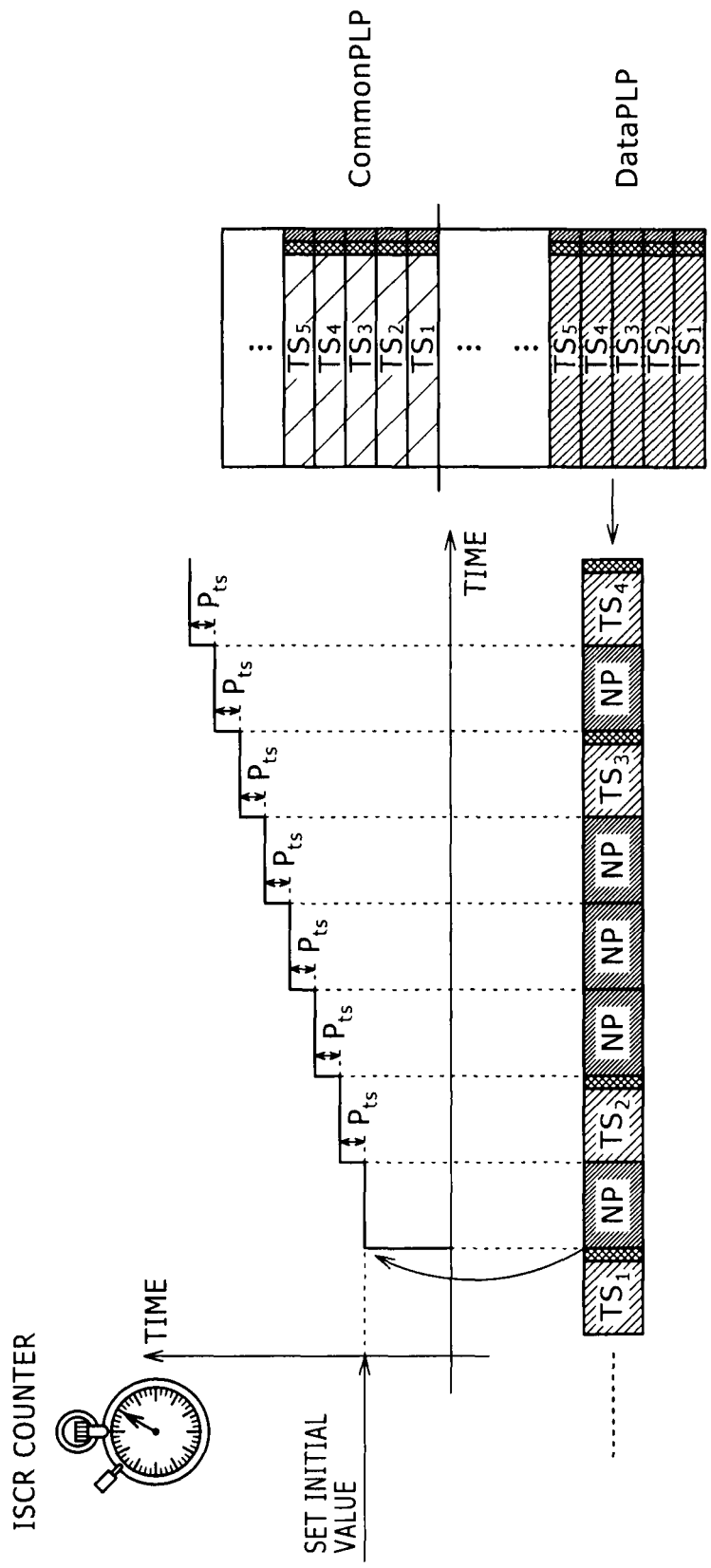
FIG. 12 is a schematic diagrammatic view illustrating details of an ISCR counter.

As shown in FIG. 12, if readout of a TS packet accumulated in the buffer 31 is started after synchronism by TTOs is established, then the time displacement detector 51 acquires the ISCR added to the TS packet and initializes the ISCR counter 51A. In particular, since the ISCR counter 51A counts relative time obtained using reference time indicated by a predetermined ISCR as a reference, the value of the ISCR is set as an initial value first. Then, the ISCR counter 51A after the initialization successively adds a value of the packet rate $P_{ts}$ which indicates a period of time per one packet every time a TS packet is read out to determine the relative time as a true value of the ISCR represented by the axis of ordinate in FIG. 12.

As described above with reference to FIG. 10, as the value of the packet rate $P_{ts}$, a value determined by calculation of the expression (2) by the readout rate calculation portion 33 can be used.

In the example illustrated in FIG. 12, while the packets $TS_1, TS_2, TS_3, TS_4, TS_5$ and . . . as TS packets of the Data PLP stored in the buffer 31 and the ISSY and the DNP added to the TSs just described are successively read out, the ISCR is added to the top packet $TS_1$ and is set as an initial value of the ISCR counter 51A. Further, since the DNP just after that of the packet $TS_1$ indicates 1, one Null packet is inserted and then the second $TS_2$ is read out. At this time, since one TS packet is read out, the ISCR counter 51A is counted up by $P_{ts}$.

Thereafter, the TS packet and a number of Null packets corresponding to the value of the DNP added to the TS packet are successively read out. Consequently, a Null packet NP, a Null packet NP, a Null packet NP, the TS packet $TS_3$, a Null packet NP, the TS packet $TS_4$ and . . . are successively read out after the TS packet $TS_2$ is read out. At this time, after a point of time at which readout of the packets is started, the ISCR counter 51A is successively counted up by $P_{ts}$. In particular, since the value of the ISCR counter 51A is incremented by $P_{ts}$ every time readout of a new packet is started, the value of the counter is represented by such a stairway-shaped line as shown in FIG. 12.

Figure 13:
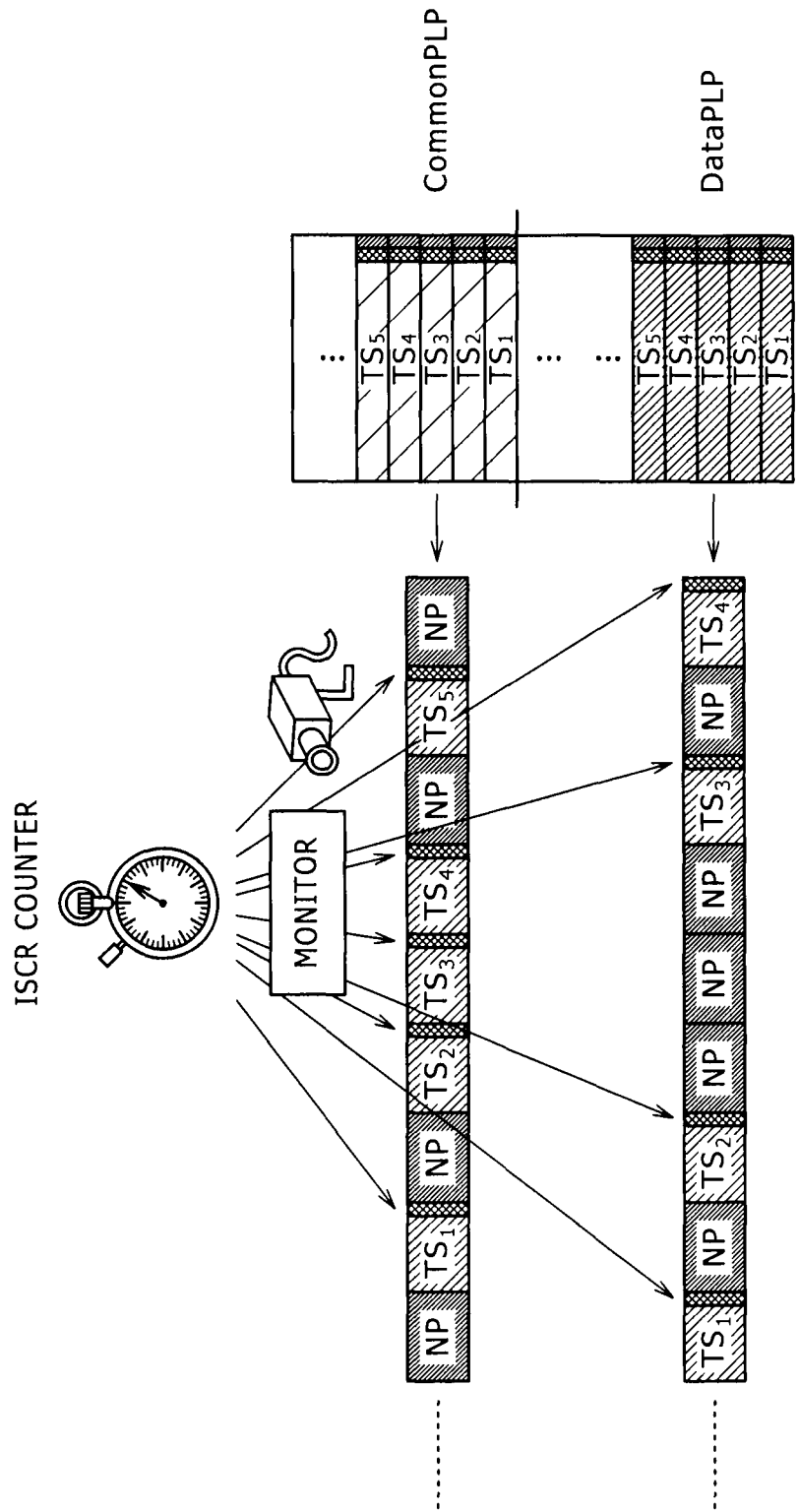
FIG. 13 is a schematic diagrammatic view illustrating time displacement detection of an ISC.

Then, as illustrated in FIG. 13, the time displacement detector 51 monitors the ISSYs added individually to the Common PLP and the Data PLP and acquires an ISCR transmitted at a predetermined timing. If an added ISCR is acquired, then the time displacement detector 51 compares the value of the acquired ISCR, that is, additional time, and the counter value, which is relative time, counted by the ISCR counter 51A to detect displacement between the additional time and the relative time.

In particular, in a normal state, the value of the relative time and the value of the additional time are equal to each other. On the other hand, in the case where an error packet is inputted from a cause of a reception channel environment or the like and an error value is given by the DNP, after the error DNP is read out, the output timings of the Common PLP and the Data PLP are displaced with each other. If the displacement is not corrected, then the synchronism between the Common PLP and the Data PLP still remains lost. Therefore, this displacement, that is, displacement between the relative time and the additional time, is detected by the time displacement detector 51.

Figure 14:
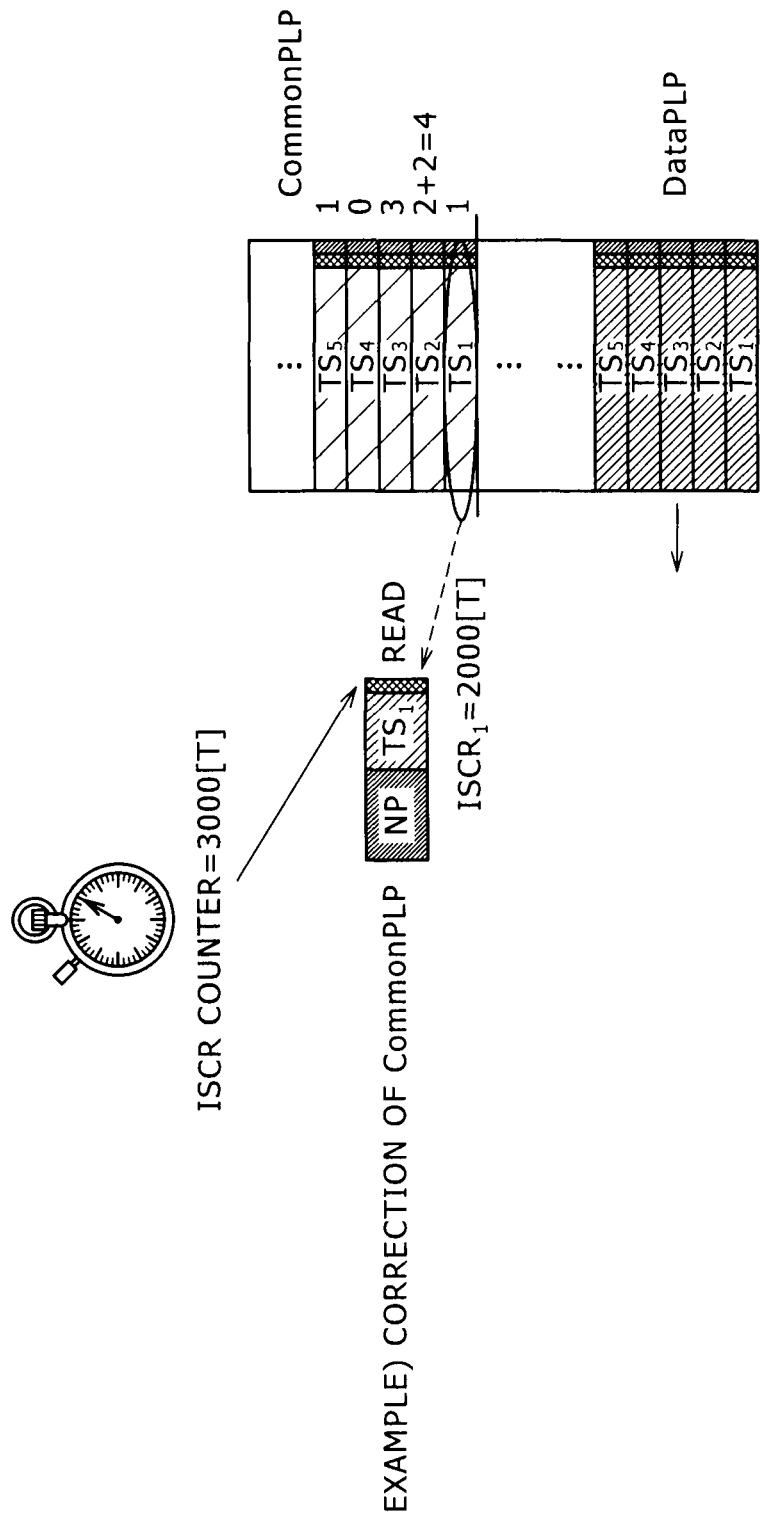
FIG. 14 is a schematic diagrammatic view illustrating ISC synchronism correction.

FIG. 14 illustrates an example wherein readout of a TS packet is carried out earlier by a period of time corresponding two packets than the counter value of the ISCR counter 51A.

Referring to FIG. 14, for example, in the case where the counter value of the ISCR counter 51A is 3000 [T] and the ISCR $ISCR_1$ added to the read out TS packet $TS_1$ indicates 2000 [T], the difference between the ISCRs (such difference is hereinafter referred to sometime as $ISCR_{diff}$) is 3000−2000=1000 [T]. Here, if the packet rate $P_{ts}$ is 500 [T/packet], then readout of the TS packet is carried out earlier by two packets.

If such a displacement in the time direction as described above is detected, the time displacement corrector 52 adds two to the value of the next DNP of the ISCR $ISCR_1$ to carry out correction of DNP=2+2=4. Consequently, the readout timing of the TS packet is made later so that the value of the ISCR added to the TS packet and the count value come to coincide with each other. Consequently, synchronization between the Common PLP and the Data PLP is re-established at a point of time at which the values coincide with each other.

In this manner, in the read control portion 34, the time displacement detector 51 counts the number of ISCRs by means of the ISCR counter 51A and detects displacement of readout time of the ISCR added to the monitored TS packet using the counter value as a true value. Then, if the readout time of the ISCR is displaced, then, in response to the detected displacement, the time displacement corrector 52 waits by a predetermined period of time to delay readout of the TS packet or outputs the TS packet earlier by a predetermined period of time to hasten readout of the TS packet.

More particularly, if the time indicated by the counter value of the ISCR counter 51A is earlier than the time indicated by the value of the ISCR added to the read out TS packet, then the time displacement corrector 52 decreases the value of the DNP of the TS packet. However, if the time indicated by the counter value of the ISCR counter 51A is later than the time indicated by the value of the ISCR added to the read out TS packet, then the time displacement corrector 52 increases the value of the DNP of the TS packet.

In this manner, the number of ISCRs disposed and added to the TS packets is basically greater than that of TTOs and so forth and the ratio at which an ISCR is included as an ISSY is high. Therefore, if re-synchronization is carried out using the ISSY, then even if the readout timing of the packet is displaced, since the displacement of the readout timing is corrected immediately, the re-synchronization can be carried out with certainty.

Re-Synchronization Process

Now, a re-synchronization process executed by the readout control portion 34 is described with reference to a flow chart of FIG. 15.

In the buffer 31, PLPs supplied from the error correction block 22 are accumulated under the writing control of the write control portion 32. At step S11, the readout control portion 34 reads out a TS packet of a PLP accumulated in the buffer 31 and Null packets corresponding to the DNP. At step S12, the readout control portion 34 discriminates whether or not initialization of the ISCR counter 51A is completed.

If it is discriminated at step S12 that the initialization of the ISCR counter 51A is not completed, then processing at step S13 is skipped and the processing advances to step S14. At step S14, the readout control portion 34 discriminates whether or not an ISCR is added to the read out TS packet.

If it is discriminated at step S14 that an ISCR is added to the read out TS packet, then, at step S15, the readout control portion 34 reads out the ISCR and, at step S16, the readout control portion 34 discriminates whether or not the initialization of the ISCR counter 51A is completed.

If it is discriminated at step S16 that the initialization of the ISCR counter 51A is not completed, then the time displacement detector 51 sets the value of the read out ISCR, that is, reference time, as an initial value of the ISCR counter 51A at step S17.

On the other hand, if the discrimination at step S14 is "No," that is, if it is discriminated at step S14 that an ISCR is not added to the read out TS packet, that is, the read out TS packet is any other packet such as a TS packet to which an ISSY other than the ISCR is added or a Null packet, then the processing advances to step S25. At step S25, the packet is outputted. Then, if it is discriminated at step S26 that inputting of data is not completed, that is, if the discrimination at step S26 is "No," then the processing returns to step S11 to repeat the processes described above.

In particular, although a TS packet and a number of Null packets corresponding to a DNP accumulated in the buffer 31 are successively read out, if initialization is completed and the discrimination at step S12 is "Yes," then the time displacement detector 51 adds, at step S13, the packet rate $P_{ts}$ to the ISCR counter 51A at a point of time at which readout of the packets is started. Consequently, as shown in FIG. 12, the count value of the ISCR counter 51A is successively counted up by the packet rate $P_{ts}$ from the value of the ISCR set as the initial value. Consequently, the relative time to be used as a true value is counted.

Then, if an ISCR is added to the read out packet and consequently the discrimination at step S14 is "Yes," then the readout control portion 34 reads out the ISCR at step S15.

Further, if the initialization is completed already and the discrimination at step S16 is "Yes," then the time displacement detector 51 compares, at step S18, the count value of the ISCR counter 51A, that is, the relative time, and the value of the read out ISCR, that is, the additional time, with each other to determine the difference $ISCR_{diff}$ between the values.

At step S19, the time displacement detector 51 discriminates whether or not the difference $ISCR_{diff}$ is greater than a predetermined threshold value. If it is discriminated at step S19 that the difference $ISCR_{diff}$ is greater than the predetermined threshold value, then the time displacement detector 51 discriminates at step S20 whether or not a DNP is added to the TS packet.

If it is discriminated at step S20 that a DNP is added, then the readout control portion 34 reads out the DNP from the TS packet accumulated in the buffer 31 at step S21. Then, the time displacement corrector 52 converts the difference $ISCR_{diff}$ detected by the time displacement detector 51 into a packet number and adds or subtracts the value of the packet number to or from the DNP to obtain a new DNP value at step S22. Then at step S23, the time displacement corrector 52 outputs a selection signal to the selector 36 or the selector 37 so that a number of Null packets, produced by the Null packet production portion 35, equal to the newly determined value of the DNP are outputted.

In particular, if the additional time of the ISCR added to the packet of the Common PLP is earlier than the relative time indicated by the counter value of the ISCR counter 51A, then the time displacement corrector 52 supplies a selection signal to the selector 36 to select Null packets corresponding to the time displacement. In this instance, the selector 36 selects the Null packets from the Null packet production portion 35 in accordance with the selection signal and supplies the selected Null packets to the PLP combining portion 38. In other words, it is considered that the value of the DNP has increased.

On the other hand, if the additional time of the ISCR added to the packet of the Common PLP is later than the relative time, then upon replacement of the DNP into Null packets, a selection signal for selecting Null packets subtracted in accordance with the difference $ISCR_{diff}$ is supplied to the selector 36. In this instance, the selector 36 selects a number of Null packets equal to the newly determined value of the DNP so that the number of Null packets to be outputted is subtracted. In other words, in this instance, it is considered that the value of the DNP has decreased.

Also the selector 37 selects and outputs the Data PLP or Null packets in accordance with a selection signal corresponding to a newly determined DNP supplied from the time displacement corrector 52.

For example, although the DNP of a packet of a certain Data PLP correctly is three, depending upon the reception environment, there are instances where the DNP=2 is received. In this instance, Data PLPs after the wrong DNP is read out continue to be read out earlier by a period of time corresponding to one packet. In other words, the time displacement detector 51 compares the value of the ISCR, that is, the additional time, and the counter value, that is, the relative time, to detect that packets of the Data PLP are read out earlier by a one-packet period and then causes the time displacement corrector 52 to correct the displacement. The time displacement corrector 52 supplies a selection signal, for example, for increasing the number of DNPs to be read out subsequently to the packet of the Data PLP to the selector 37 to increase the number of Null packets by one. Consequently, the readout timing of the Data PLP returns to a normal timing so that the common PLP and the Data PLP are synchronized with each other again.

At step S24, it is discriminated whether or not the outputting of Null packets is completed. If the outputting of Null packets is completed, then the time displacement corrector 52 outputs a selection signal to the selector 36 or the selector 37 so that a packet accumulated in the buffer 31 is outputted at step S25.

Consequently, since the Common PLP to be outputted from the selector 36 and the Data PLP to be outputted from the selector 37 are synchronized with each other, the PLP combining portion 38 combines and outputs the PLPs.

It is to be noted that, if it is discriminated at step S19 that the difference $ISCR_{diff}$ is smaller than the predetermined threshold value and consequently the discrimination at step S19 is "No," then since the displacement in time remains within an anticipated range, correction is not carried out while the re-synchronization process is executed continuously. Or, also in a case in which displacement in time occurs, if no DNP is added to the TS packet and consequently the discrimination at step S20 is "No," adjustment of Null packets cannot be carried out. Therefore, in this instance, the re-synchronization process is executed after it is waited that a TS packet to which a DNP is added is received.

Figure 15:
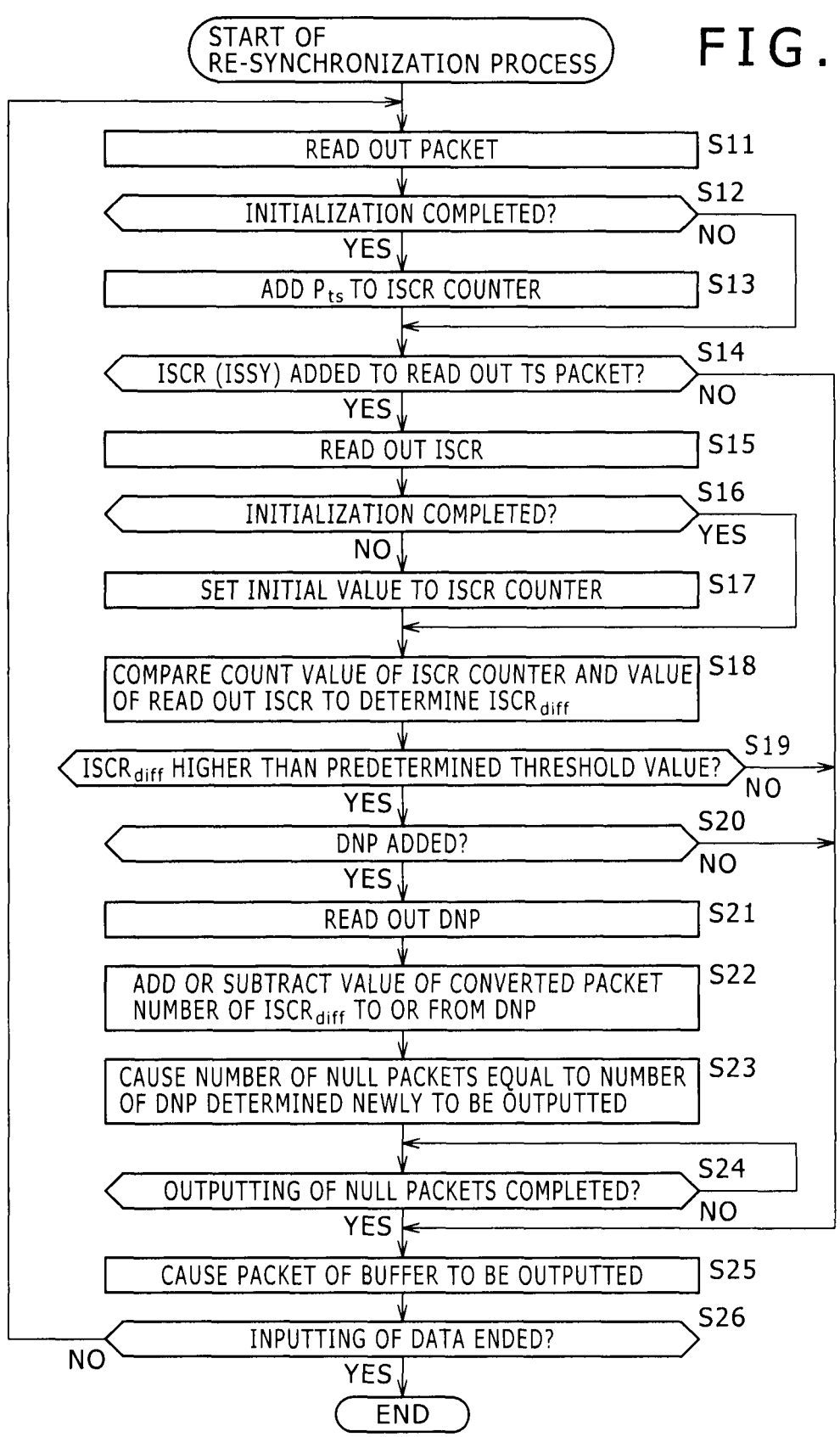
FIG. 15 is a flow chart illustrating a re-synchronization process.

Then, if it is discriminated at step S26 that the inputting of data to the buffer 31 is ended, the re-synchronization process of FIG. 15 is ended.

As described above, the time displacement detector 51 successively adds the packet rate $P_{ts}$ to reference time indicated by an ISCR which is determined as a reference to obtain relative time, which is counted by the ISCR counter 51A. Then, the counted relative time and additional time indicated by an ISCR later in time than the ISCR which is determined as the reference are compared with each other. Then, the time displacement corrector 52 corrects the displacement in the time direction between the Common PLP and the Data PLP accumulated in the buffer 31 based on a result of the detection by the time displacement detector 51.

Consequently, even in the case where the readout timings of packets of the Common PLP and the Data PLP are displaced from each other or only a Data PLP is transmitted, when the readout timings are displaced from each other, the timings can be returned to correct timings.

It is to be noted that, while, in the present embodiment, a method of counting the packet rate $P_{ts}$, which is a period of time representing the length of one packet in a unit of an Elementary Period, is described as an example of the counting method of the ISCR counter 51A, also it is possible to use some other counting method. As such counting method, for example, it is possible to use the value of an Elementary Period. In this instance, for example, if the value of the Elementary Period is 7/64 us, then the count value is counted up by one 1 [T] after every 7/64 us.

Further, since the ISCR or the packet rate $P_{ts}$ sometimes has an error, if the displacement between the counter value of the ISCR counter 51A, that is, the relative time, and the value of the ISCR added to the TS packet, that is, the additional time, remains within one half packet, that is, if the displacement is smaller than a value obtained by dividing the packet rate $P_{ts}$ by two, then if the counter value is adjusted to the value of the ISCR added to the TS packet, then such a situation that the error is accumulated to such a degree that wrong out-of-synchronism is detected can be prevented.

Also it is possible for the time displacement corrector 52 to adopt, when the readout timing of a packet is to be corrected, a correction method of displacement of time other than the correction of the value of a DNP described hereinabove. For example, if the readout timing is earlier, then the time displacement corrector 52 may merely wait reading out of the packet by a period of time corresponding to the displacement in time. In particular, in this instance, the time displacement corrector 52 delays outputting of the packet by a predetermined period of time or causes the packet to be outputted earlier by a predetermined period of time in response to the displacement in time detected by the time displacement detector 51.

Example of the Configuration of the Reception System

Now, a configuration of the reception system is described with reference to FIGS. 16 to 18.

Figure 16:
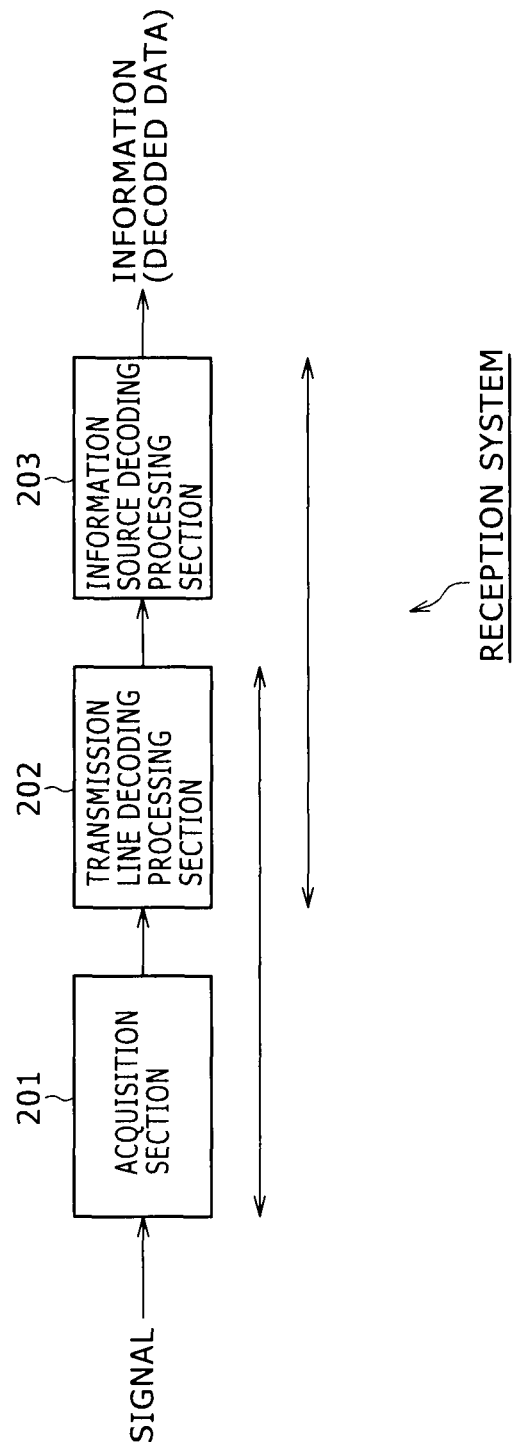
FIGS. 16, 17 and 18 are block diagrams showing different reception systems to which the present invention is applied.

FIG. 16 shows an example of a configuration of a first mode of a reception system to which the present invention is applied.

Referring to FIG. 16, the reception system includes an acquisition section 201, a transmission line decoding processing section 202 and an information source decoding processing section 203.

The acquisition section 201 acquires an OFDM signal of the M-PLP system of DVB-T2 through a transmission line such as, for example, terrestrial digital broadcasting, satellite broadcasting, a CATV (Cable Television) network, the Internet or some other network not shown. The acquisition section 201 supplies the acquired OFDM signal to the transmission line decoding processing section 202.

If the OFDM signal is broadcast, for example, from a broadcasting station through a ground wave, a satellite wave, a CATV network or the like, then the acquisition section 201 is configured from a tuner, an STB or the like similarly to the acquisition section 12 shown in FIG. 2. On the other hand, if the OFDM signal is transmitted, for example, from a WEB server by multicast as in the case of IPTV (Internet Protocol Television), the acquisition section 201 is configured from a network I/F such as, for example, an NIC (Network Interface Card).

If the OFDM signal is broadcast, for example, from a broadcasting station through a ground wave, a satellite wave, a CATV network or the like, then, for example, a plurality of OFDM signals transmitted from a plurality of transmission apparatus through a plurality of transmission lines are received by the acquisition section 201. As a result, the plural OFDM signals are received as a combined single OFDM signal.

The transmission line decoding processing section 202 carries out a transmission line decoding process including at least a process of decoding PLPs from an OFDM signal acquired by the acquisition section 201 through a transmission line. Then, the transmission line decoding processing section 202 supplies a signal obtained by the transmission line decoding process to the information source decoding processing section 203.

In particular, since an OFDM signal by the M-PLP system is defined by a plurality of Data PLPs configured from packets which remain when a packet common to all of a plurality of TSs is extracted from each of the TSs and a Common PLP configured from the common packet, the transmission line decoding processing section 202 carries out, for example, a process of decoding PLPs (packet sequence) for the OFDM signal and outputs a resulting signal.

Further, the OFDM signal acquired by the acquisition section 201 through a transmission line is in a state distorted by an influence of a transmission line characteristic, and the transmission line decoding processing section 202 carries out a decoding process including, for example, transmission line estimation, channel estimation, phase estimation and so forth for such OFDM signal.

Further, the transmission line decoding process includes a process of correcting errors caused by the transmission line and so forth. For example, as error correction coding, LDPC code, Reed Solomon coding and so forth are available.

The information source decoding processing section 203 carries out an information source decoding process including at least a process of decompressing compressed information into original information for the signal for which the transmission line decoding process has been carried out.

In particular, the OFDM signal acquired by the acquisition section 201 through a transmission line is sometimes in a state in which compression coding for compressing information in order to reduce the data amount of images, sound and so forth as information is applied. In this instance, the information source decoding processing section 203 carries out an information source decoding process such as a process of decompressing the compressed information into original information and so forth for the signal to which the transmission line decoding process has been carried out.

It is to be noted that, if the OFDM signal acquired by the acquisition section 201 through the transmission line is not in a compression coded form, then the information source decoding processing section 203 does not carry out the process of decompressing compressed information into original information.

Here, the decompression process may be, for example, MPEG decoding. Further, the transmission line decoding process sometimes includes descrambling and so forth in addition to the decompression process.

In the reception system configured in such a manner as described above, the acquisition section 201 acquires, through the transmission line, an OFDM signal according to the M-PLP system obtained by applying compression coding such as MPEG coding and further applying error correction coding for data, for example, of an image and sound. The acquisition section 201 supplies the acquired OFDM signal to the transmission line decoding processing section 202. It is to be noted that, at this time, the OFDM signal is acquired in a state distorted by an influence of a transmission line characteristic.

The transmission line decoding processing section 202 carries out a process similar to that of the transmission line decoding processing section 13 shown in FIG. 2 as a transmission line decoding process for the OFDM signal from the acquisition section 201. The transmission line decoding processing section 202 supplies a signal obtained as a result of the transmission line decoding process to the information source decoding processing section 203.

The information source decoding processing section 203 carries out a process similar to that of the decoder 14 shown in FIG. 2 as an information source decoding process for the signal from the transmission line decoding processing section 202. The information source decoding processing section 203 outputs an image or sound obtained as a result of the information source decoding process.

Such a reception system of FIG. 16 as described above can be applied, for example, to a television tuner or the like which receives television broadcasting as digital broadcasting.

It is to be noted that the acquisition section 201, transmission line decoding processing section 202 and information source decoding processing section 203 can each be configured as a single independent apparatus or hardware apparatus such as an IC (Integrated Circuit) or a software module.

Further, the acquisition section 201, transmission line decoding processing section 202 and information source decoding processing section 203 can be configured in different manners. For example, a set of the acquisition section 201 and the transmission line decoding processing section 202, a set of the transmission line decoding processing section 202 and the information source decoding processing section 203 or a set of the acquisition section 201, the transmission line decoding processing section 202, and information source decoding processing section 203 can be configured as a single independent apparatus.

Figure 17:
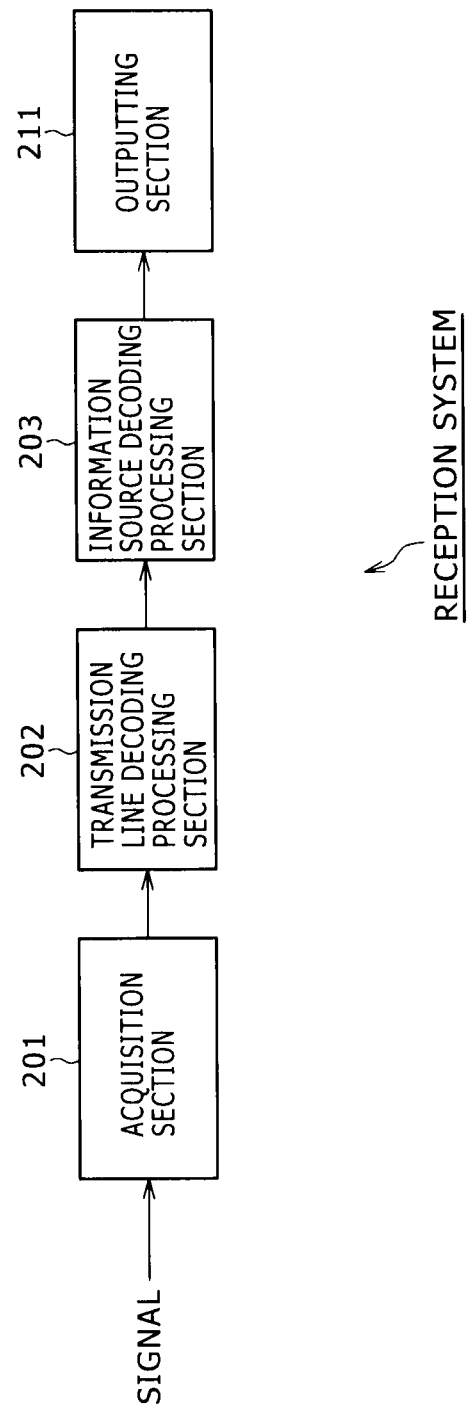

FIG. 17 shows an example of a configuration of a second mode of the reception system to which the present invention is applied.

The reception system shown in FIG. 17 includes common components to those of the reception system described hereinabove with reference to FIG. 16, and overlapping description of the common components is omitted herein to avoid redundancy.

Referring to FIG. 17, the reception system shown is common to the reception system described hereinabove with reference to FIG. 16 in that it includes an acquisition section 201, a transmission line decoding processing section 202 and an information source decoding processing section 203 but is different from the reception system of FIG. 16 in that it additionally includes an outputting section 211.

The outputting section 211 may be, for example, a display apparatus for displaying an image and/or a speaker for outputting sound, and outputs an image, sound or the like as a signal outputted from the information source decoding processing section 203. In other words, the outputting section 211 displays an image and/or outputs sound.

Such a reception system of FIG. 17 as described above can be applied, for example, to a television set for receiving television broadcasting as digital broadcasting, a radio receiver for receiving radio broadcasting and so forth.

It is to be noted that, if the OFDM signal acquired by the acquisition section 201 is not in a compression coded state, then a signal outputted from the transmission line decoding processing section 202 is supplied to the outputting section 211.

Figure 18:
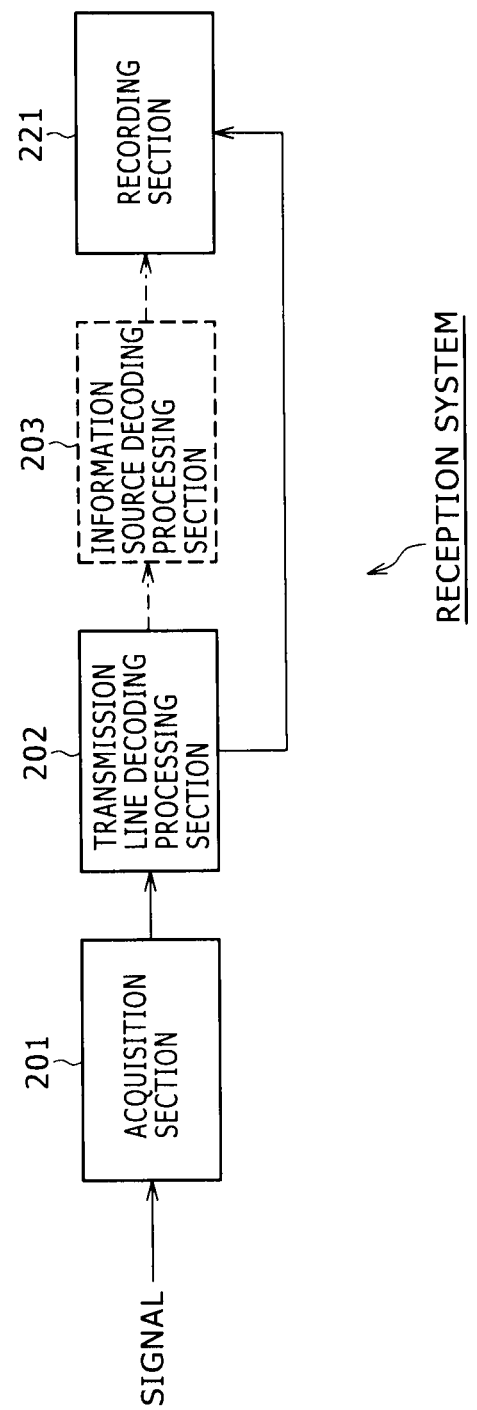

FIG. 18 shows an example of a configuration of a third mode of the reception system to which the present invention is applied.

The reception system shown in FIG. 18 includes common components to those of the reception system described hereinabove with reference to FIG. 16, and overlapping description of the common components is omitted herein to avoid redundancy.

Referring to FIG. 18, the reception system shown is similar to that of FIG. 16 in that it includes an acquisition section 201 and a transmission line decoding processing section 202.

It is to be noted, however, that the reception system of FIG. 18 is different from that of FIG. 16 in that it does not include the information source decoding processing section 203 but includes a recording section 221.

The recording section 221 records a signal outputted from the transmission line decoding processing section 202, for example, a TS packet of a TS of MPEG, in a recording (storage) medium such as an optical disk, a hard disk (magnetic disk) or a flash memory.

The reception system of FIG. 18 having such a configuration as described above can be applied to a recorder for recording a television broadcast or the like.

It is to be noted that the reception system of FIG. 18 may additionally include the information source decoding processing section 203 such that a signal after an information source decoding process is applied by the information source decoding processing section 203, that is, an image or sound obtained by decoding, can be recorded by the recording section 221.

Computer to which the Invention is Described

Incidentally, while the series of processes described above can be executed by hardware, it may otherwise be executed by software. Where the series of processes is executed by software, a program which constructs the software is installed into a computer. The computer in this instance includes a computer incorporated in hardware for exclusive use, a personal computer for universal use which can execute various functions by installing various programs, and so forth.

Figure 19:
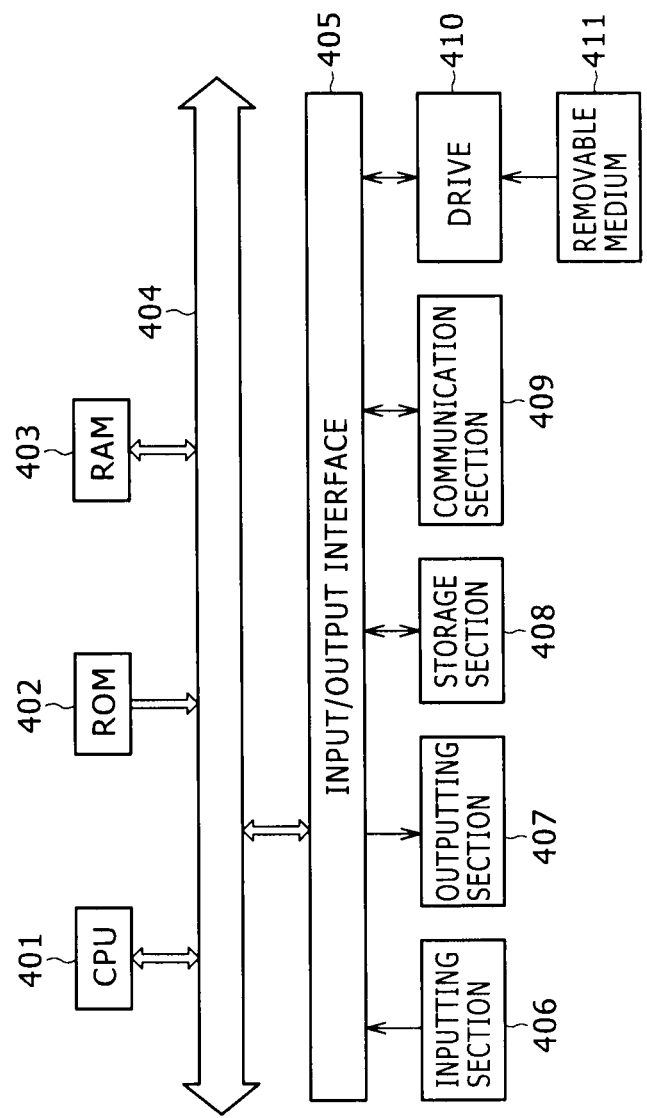
FIG. 19 is a block diagram showing an example of a hardware configuration of a computer.

FIG. 19 shows an example of a hardware configuration of a computer which executes the series of processes described hereinabove in accordance with a program.

Referring to FIG. 19, in the computer shown, a central processing unit (CPU) 401, a read only memory (ROM) 402 and a random access memory (RAM) 403 are connected to one another by a bus 404.

Further, an input/output interface 405 is connected to the bus 404. An inputting section 406, an outputting section 407, a storage section 408 and a communication section 409 and a drive 410 are connected to the input/output interface 405.

The inputting section 406 includes a keyboard, a mouse, a microphone and so forth. The outputting section 407 includes a display unit, a speaker and so forth. The storage section 408 includes a hard disk, a nonvolatile memory or the like. The communication section 409 includes a network interface or the like. The drive 410 drives a removable medium 411 such as a magnetic disk, an optical disk, a magneto-optical disk or a semiconductor memory.

In the computer configured in such a manner as described above, the CPU 401 loads a program stored, for example, in the storage section 408 into the RAM 403 through the input/output interface 405 and the bus 404 and executes the program to carry out the series of processes described above.

The program to be executed by the computer, particularly by the CPU 401, can be recorded on and provided as a removable medium 411, for example, as a package medium or the like. Further, the program can be provided through a wire or wireless transmission medium such as a local area network, the Internet or a digital broadcast.

In the computer, the program can be installed into the storage section 408 through the input/output interface 405 by loading the removable medium 411 into the drive 410. Further, the program can be received by the communication section 409 through a wire or wireless transmission medium and installed into the storage section 408. Or, the program may be installed in advance in the ROM 402 or the storage section 408.

It is to be noted that, in the present specification, the steps which describe the program recorded in or on a recording medium may be but need not necessarily be processed in a time series in the order as described, and include processes which are executed in parallel or individually without being processed in a time series.

Further, in the present specification, the term "system" is used to represent an entire apparatus composed of a plurality of devices or apparatus.

While preferred embodiments of the present invention have been described using specific terms, such description is for illustrative purpose only, and it is to be understood that changes and variations may be made without departing from the spirit or scope of the following claims.

The present application contains subject matter related to that disclosed in Japanese Priority Patent Application JP 2010-000919 filed in the Japan Patent Office on Jan. 6, 2010, the entire content of which is hereby incorporated by reference.

What is claimed is:

1. A reception apparatus, comprising:
a receiver to receive an Orthogonal Frequency Division Multiplexed (OFDM) signal by modulating a common packet sequence that is configured from a packet common to a plurality of streams and a data packet sequence that is configured from a plurality of packets individually unique to the plurality of streams;
a counter, in a processing circuitry, to count an elapsed time that is relative to a predetermined time that is a reference time indicated by additional information added to particular packets of the common packet sequence and the data packet sequence, the particular packets obtained by demodulating the received OFDM signal;
a detector, in the processing circuitry, to detect a displacement in a time direction between the particular packets of the common packet sequence and the data packet sequence by comparing the counted elapsed time and an additional time with each other, the additional time indicated by the additional information added to a first packet of the particular packets of the common packet sequence and the data packet sequence that is later in time that a second packet of the particular packets of the common packet sequence and the data packet sequence; and
a corrector, in the processing circuitry, to correct the displacement in the time direction between the particular packets of the common packet sequence and the data packet sequence direction based on the detected displacement by correcting a readout timing of the particular packets of the common packet sequence and the data packet sequence.

2. The reception apparatus according to claim 1, wherein the counter in the processing circuitry counts the elapsed time by successively adding time per one packet for each packet to the predetermined time.

3. The reception apparatus according to claim 2, further comprising a producer, in the processing circuitry, to produce the common packet sequence and the data packet sequence as Common Physical Layer Pipes (PLPs), respectively, from the plurality of streams in accordance with the Multiple PLP (M-PLP) system of Digital Video Broadcasting-Terrestrial (DVB-T).

4. The reception apparatus according to claim 3, wherein the additional information is an Input Stream Time Reference (ISCR) which indicates a timestamp added upon transmission.

5. The reception apparatus according to claim 4, wherein
the ISCR and a Deleted Null Packet (DNP) which is information indicative of a number of Null packets are added as the additional information to the particular packets,
the corrector in the processing circuitry increases the value of the DNP by a value corresponding to the displacement in the time direction when the additional time is earlier than the elapsed time, and
the corrector in the processing circuitry decreases the value of DNPs by a value corresponding to the displacement in the time direction when the additional time is later than the elapsed time.

6. A reception method comprising:
receiving, by processing circuitry, an Orthogonal Frequency Division Multiplexed (OFDM) signal by modulating a common packet sequence that is configured from a packet common to a plurality of streams and a data packet sequence configured from a plurality of packets individually unique to the plurality of streams;
counting, by the processing circuitry, an elapsed time that is relative to a predetermined time that is a reference time indicated by additional information added to particular packets of the common packet sequence and the data packet sequence, the particular packets obtained by demodulating the received OFDM signal;
detecting, by the processing circuitry, a displacement in a time direction between the particular packets of the common packet sequence and the data packet sequence by comparing the counted elapsed time and an additional time with each other, the additional time indicated by the additional information added to a first packet of the particular packets of the common packet sequence and the data packet sequence that is later in time that a second packet of the particular packets of the common packet sequence and the data packet sequence; and
correcting, by the processing circuitry, the displacement in the time direction between the particular packets of the common packet sequence and the data packet sequence based on the detected displacement by correcting a readout timing of the particular packets of the common packet sequence and the data packet sequence.

7. A reception system, comprising:
a receiver that receives, through a transmission line, an Orthogonal Frequency Division Multiplexed (OFDM) signal by modulating a common packet sequence that is configured from a packet common to a plurality of streams and a data packet sequence that is configured from a plurality of packets individually unique to the plurality of streams; and
a transmission line decoding processing circuitry configured to perform a transmission line decoding including at least a decoding circuitry for decoding the plurality of streams for the OFDM signal acquired through the transmission line, wherein the decoding circuitry is configured to
count an elapsed time that is relative to a using predetermined time that is a reference time indicated by additional information added to particular packets of the common packet sequence and the data packet sequence, the particular packets obtained by demodulating the OFDM signal acquired through the transmission line,
detect a displacement in a time direction between the particular packets of the common packet sequence and the data packet sequence by comparing the counted elapsed time and an additional time with each other, the additional time indicated by the additional information added to a first packet of the particular packets of the common packet sequence and the data packet sequence that is later in time that a second packet of the particular packets of the common packet sequence and the data packet sequence, and
correct the displacement in the time direction between the particular packets of the common packet sequence and the data packet sequence based on the detected displacement by correcting a readout timing of the particular packets of the common packet sequence and the data packet sequence.

8. A reception system, comprising:
a transmission line decoding processing circuitry configured to perform, for an Orthogonal Frequency Division Multiplexed (OFDM) signal obtained by modulating a common packet sequence that is configured from a packet common to a plurality of streams and a data packet sequence that is configured from a plurality of packets individually unique to the plurality of streams and acquired through a transmission line, a transmission line decoding including at least a decoding of the plurality of streams; and an information source decoding processing circuitry configured to perform, for the OFDM signal for which the transmission line decoding is carried out, an information source decoding including at least a decoding circuitry configured to decompress compressed information into original information;

said transmission line decoding processing section including circuitry configured to perform the transmission line decoding, wherein the transmission line decoding is configured to count an elapsed time that is relative to a predetermined time that is a reference time indicated by additional information added to particular packets of the common packet sequence and the data packet sequence, the particular packets obtained by demodulating the OFDM signal acquired through the transmission line, detect a displacement in a time direction between the particular packets of the common packet sequence and the data packet sequence by comparing the counted elapsed time and an additional time with each other, the additional time indicated by the additional information added to a first packet of the particular packets of the common packet sequence and the data packet sequence that is later in time that a second packet of the particular packets of the common packet sequence and the data packet sequence, and correct the displacement in the time direction between the particular packets of the common packet sequence and the data packet sequence based on the detected displacement by correcting a readout timing of the particular packets of the common packet sequence and the data packet sequence.

9. A reception system, comprising:

transmission line decoding processing circuitry configured to perform, for an Orthogonal Frequency Division Multiplexed (OFDM) signal obtained by modulating a common packet sequence that is configured from a packet common to a plurality of streams and a data packet sequence that is configured from a plurality of packets individually unique to the plurality of streams and acquired through a transmission line, a transmission line decoding including at least a decoding of the packet plurality of streams; and an output circuitry configured to output an image or sound based on the OFDM signal for which the transmission line decoding is carried out;

said transmission line decoding processing circuitry configured to perform the transmission line decoding, wherein the transmission line decoding is configured to count an elapsed time that is relative to a predetermined time that is a reference time indicated by additional information added to particular packets of the common packet sequence and the data packet sequence, the particular packets obtained by demodulating the OFDM signal acquired through the transmission line, detect a displacement in a time direction between the particular packets of the common packet sequence and the data packet sequence by comparing the counted elapsed time and an additional time with each other, the additional time indicated by the additional information added to a first packet of the particular packets of the common packet sequence and the data packet sequence that is later in time that a second packet of the particular packets of the common packet sequence and the data packet sequence, and correct the displacement in the time direction between the particular packets of the common packet sequence and the data packet sequence based on the detected displacement by correcting a readout timing of the particular packets of the common packet sequence and the data packet sequence.

10. A reception system, comprising:

transmission line decoding processing circuitry configured to perform, for an Orthogonal Frequency Division Multiplexed (OFDM) signal obtained by modulating a common packet sequence that is configured from a packet common to a plurality of streams and a data packet sequence that is configured from a plurality of packets individually unique to the plurality of streams and acquired through a transmission line, a transmission line decoding including at least a decoding of the plurality of streams; and recording circuitry configured to record the OFDM signal for which the transmission line decoding is carried out;

said transmission line decoding processing circuitry configured to perform the transmission line decoding, wherein the transmission line decoding is configured to count an elapsed time that is relative to a predetermined time that is a reference time indicated by additional information added to particular packets of the common packet sequence and the data packet sequence, the particular packets obtained by demodulating the OFDM signal acquired through the transmission line, detect a displacement in a time direction between the particular packets of the common packet sequence and the data packet sequence by comparing the counted elapsed time and an additional time with each other, the additional time indicated by the additional information added to a first packet of the particular packets of the common packet sequence and the data packet sequence that is later in time that a second packet of the particular packets of the common packet sequence and the data packet sequence, and correct the displacement in the time direction between the particular packets of the common packet sequence and the data packet sequence based on the detected displacement by correcting a readout timing of the particular packets of the common packet sequence and the data packet sequence.

11. A non-transitory computer readable medium that stores computer executable instructions that, when executed by a computer including processing circuitry, cause the computer to perform a process, the process comprising:

receiving an Orthogonal Frequency Division Multiplexed (OFDM) signal by modulating a common packet sequence that is configured from a packet common to a plurality of streams and a data packet sequence configured from a plurality of packets individually unique to the plurality of streams;

counting an elapsed time that is relative to a predetermined time that is a reference time indicated by additional information added to particular packets of the common packet sequence and the data packet sequence, the particular packets obtained by demodulating the received OFDM signal;

detecting a displacement in a time direction between the particular packets of the common packet sequence and the data packet sequence by comparing the counted elapsed time and an additional time with each other, the additional time indicated by the additional information added to a first packet of the particular packets of the common packet sequence and the data packet sequence that is later in time that a second packet of the particular packets of the common packet sequence and the data packet sequence; and correcting the displacement in the time direction between the particular packets of the common packet sequence and the data packet sequence based on the detected displacement by correcting a readout timing of the particular packets of the common packet sequence and the data packet sequence.

12. The reception method according to claim 6, wherein the counting is performed by counting the elapsed time by successively adding time per one packet for each packet to the predetermined time.

13. The reception method according to claim 12, further comprising producing the common packet sequence and the data packet sequence as Common Physical Layer Pipes (PLPs), respectively, from the plurality of streams in accordance with the Multiple PLP (M-PLP) system of Digital Video Broadcasting-Terrestrial (DVB-T).

14. The reception method according to claim 13, wherein the additional information is an Input Stream Time Reference (ISCR) which indicates a timestamp added upon transmission.

15. The reception method according to claim 14, wherein the ISCR and a Deleted Null Packet (DNP) which is information indicative of a number of Null packets are added as the additional information to the particular packets, and the method further comprises
increasing the value of the DNP by a value corresponding to the displacement in the time direction when the additional time is earlier than the elapsed time, and
decreasing the value of DNPs by a value corresponding to the displacement in the time direction when the additional time is later than the elapsed time.

16. The reception system according to claim 7, wherein the decoding circuitry counts the elapsed time by successively adding time per one packet for each packet to the predetermined time.

17. The reception system according to claim 16, wherein the decoding circuitry is further configured to produce the common packet sequence and the data packet sequence as Common Physical Layer Pipes (PLPs), respectively, from the plurality of streams in accordance with the Multiple PLP (M-PLP) system of Digital Video Broadcasting-Terrestrial (DVB-T).

18. The reception system according to claim 17, wherein the additional information is an Input Stream Time Reference (ISCR) which indicates a timestamp added upon transmission.

19. The reception system according to claim 18, wherein
the ISCR and a Deleted Null Packet (DNP) which is information indicative of a number of Null packets are added as the additional information to the particular packets, and the decoding circuitry is further configured to
increase the value of the DNP by a value corresponding to the displacement in the time direction when the additional time is earlier than the elapsed time, and
decrease the value of DNPs by a value corresponding to the displacement in the time direction when the additional time is later than the elapsed time.

20. The reception system according to claim 7, further comprising output circuitry configured to output an image or sound based on the OFDM signal for which the transmission line decoding process is carried out.

* * * * *